United States Patent
Muldoon

(10) Patent No.: US 11,746,455 B1
(45) Date of Patent: Sep. 5, 2023

(54) WASHLOAD COMPOSITION DETECTION

(71) Applicant: Alfred Wade Muldoon, Saint Joseph, MI (US)

(72) Inventor: Alfred Wade Muldoon, Saint Joseph, MI (US)

( * ) Notice: Subject to any disclaimer, the term of this patent is extended or adjusted under 35 U.S.C. 154(b) by 805 days.

(21) Appl. No.: 15/681,747

(22) Filed: Aug. 21, 2017

(51) Int. Cl.
| | |
|---|---|
| D06F 33/00 | (2020.01) |
| G01N 5/02 | (2006.01) |
| G01F 23/00 | (2022.01) |
| G01G 17/00 | (2006.01) |
| D06F 37/06 | (2006.01) |
| D06F 39/08 | (2006.01) |
| D06F 13/00 | (2006.01) |
| D06F 37/30 | (2020.01) |
| D06F 103/04 | (2020.01) |
| D06F 103/18 | (2020.01) |
| D06F 105/02 | (2020.01) |

(52) U.S. Cl.
CPC ............. *D06F 33/00* (2013.01); *D06F 13/00* (2013.01); *D06F 37/06* (2013.01); *D06F 37/304* (2013.01); *D06F 39/085* (2013.01); *D06F 39/087* (2013.01); *D06F 39/088* (2013.01); *G01F 23/00* (2013.01); *G01G 17/00* (2013.01); *G01N 5/02* (2013.01); *D06F 2103/04* (2020.02); *D06F 2103/18* (2020.02); *D06F 2105/02* (2020.02)

(58) Field of Classification Search
CPC .......... D06F 33/00; D06F 13/00; D06F 37/06; D06F 37/304; D06F 39/085; D06F 39/087; D06F 39/088; D06F 2202/085; D06F 2202/10; D06F 2204/06; D06F 2204/086; G01F 23/00; G01G 17/00; G01N 5/02
See application file for complete search history.

(56) References Cited

U.S. PATENT DOCUMENTS

| | | | | |
|---|---|---|---|---|
| 3,888,112 | A * | 6/1975 | De Leeuw | G01N 33/0006 73/1.05 |
| 4,741,357 | A * | 5/1988 | Battel | A47L 15/4244 137/387 |
| 5,768,729 | A * | 6/1998 | Cracraft | D06F 39/087 68/12.05 |
| 2005/0166334 | A1* | 8/2005 | Clouser | D06F 33/00 8/159 |
| 2006/0107468 | A1* | 5/2006 | Urbanet | D06F 39/083 8/158 |
| 2008/0189875 | A1* | 8/2008 | Czyzewski | D06F 35/006 8/159 |

(Continued)

*Primary Examiner* — Yoshihisa Ishizuka

(57) ABSTRACT

A method of identifying the properties of a washload contained in a washing machine based on variations in the output of a water level sensor resulting from transitions that alter the water level in the washer without requiring a change in the volume of water in the washer. Results are independent of the initial wetness of the washload. However initial wetness can also be determined. Variations are at least in part a function of the rate at which the wetness of the washload changes. The rate is nonlinear determined by the composition of the washload. In most transitions the water level is also affected by other factors most of which are at least in part a function of the composition. To simplify the identification preferred transitions occur once the washload wetness has reached equilibrium. To increase accuracy preferably both wetting and dehydrating transitions are used for identification.

20 Claims, 21 Drawing Sheets

(56) References Cited

U.S. PATENT DOCUMENTS

| | | | | |
|---|---|---|---|---|
| 2008/0282479 A1* | 11/2008 | Darby | ............... | D06F 34/18 |
| | | | | 8/159 |
| 2011/0030460 A1* | 2/2011 | Ashrafzadeh | ........... | D06F 33/02 |
| | | | | 73/65.01 |
| 2015/0176166 A1* | 6/2015 | Alexander | .............. | D06F 17/06 |
| | | | | 8/137 |
| 2015/0233036 A1* | 8/2015 | Kim | ..................... | D06F 37/265 |
| | | | | 68/12.06 |
| 2015/0240405 A1* | 8/2015 | Kwon | .................... | D06F 33/32 |
| | | | | 68/12.21 |
| 2015/0267339 A1* | 9/2015 | Schenkl | ................. | D06F 33/02 |
| | | | | 68/12.04 |

* cited by examiner

WASHLOAD COMPOSITION DETECTION

CROSS-REFERENCE TO RELATED APPLICATIONS

Not Applicable

STATEMENT REGARDING FEDERALLY SPONSORED RESEARCH

Not Applicable

REFERENCE TO SEQUENCE LISTINGS

Not Applicable

BACKGROUND OF THE INVENTION

The present invention relates to the control of washing machines using methods to sense washload properties to modify washer operation based on the properties, and in particular to systems using water detection to at least partially identify the washload. There have been many methods employed to adjust machine operation in accordance with the washload properties. There are methods in which at least some of the washload properties are not detected directly, but rather identified solely on the basis of operator supplied information. Prior methods generally either measure the weight of the washload or the amount of water absorbed by a washload. Both approaches assume a dry washload at start. A washload that is wet when loaded prohibits prior methods from accurately identifying the washload.

Many methods were developed to determine the weight of the washload. U.S. Pat. No. 4,411,143 presents a method based on the output of a strain gauge attached to a member supporting the weight of the washload. At the present measuring the inertia of a drum and washload is a more common method employed to determine weight. U.S. Pat. No. 7,475,571 shows a method in which a drum and washload are accelerated, the weight of the washload being determined by the slope of the acceleration. In U.S. Pat. No. 7,555,798 a drum and washload are accelerated to a driven speed and then the drum and washload are allowed to freewheel. The number of revolutions the drum freewheels determines the weight of the washload.

These weight detection approaches suffer from common faults. First, dry weight alone is not sufficient to identify a washload. Second, performing an inertia test takes time which lengthens total wash time. Most importantly, they all presume the washload is dry when it is tested. This condition is not a given. Operators do load washing machines with wet clothes, particularly towels. A load of wet towels will test as a dry load of much greater weight. The assumption that the washload is dry will result in an error in determining washload properties.

In addition to being loaded with wet clothes, there are a number of other conditions which will result in the washload being wet when prior approaches assume it is dry. If an operator wants to change a wash cycle or another parameter after a wash has started, generally the wash cycle must be ended which will drain the washer but the clothes will still be wet. Adding a garment to a load after a wash cycle has began is another problem in washers as wet inertia testing is not particularly accurate.

U.S. Pat. Nos. 6,023,950 and 8,220,292 and 7,380,303 attempt to define the properties of the washload by measuring the absorption of the washload. U.S. Pat. No. 6,023,950 measures the amount of water the washload absorbs and uses an unspecified method to determine the weight of the washload. The type of fabric is identified by the ratio of water absorbed to weight. Again the weight and absorbency tests assume the washload is dry when the wash cycle starts. Further U.S. Pat. No. 6,023,950 measures the fill rate between two levels and then assumes the rate will remain constant throughout the fill ignoring the fact that fill rate can vary significantly, especially when other household plumbing is used during a fill.

U.S. Pat. No. 8,220,292 shows a method in which absorption alone is used to determine the washload parameters. Washload composition is determined by comparing the initial amount of water required to bring the washload to equilibrium and the amount of water required to return to the washload to equilibrium after a the washload is spun dry. The approach assumes a constant fill rate and that the washload is dry at the start. Further, since the washload is not determined until after the first rinse fill, machine function is not adjusted to properly wash the load.

U.S. Pat. No. 7,380,303 uses a flow meter to accurately determine the volume of water added during a fill. The method determines a load equivalent, i.e. the dry weight of cotton that would have the absorbency indicated by the flow meter and water level. It does not determine the type of fabric. This method does provide a much more accurate method of measuring the amount of water added to a washer and hence the amount of water absorbed compared to methods using a pressure sensor to estimate the water added. However, the flow meter adds to the cost of the washer. And again, the method assumes a dry washload at the start.

U.S. Pat. No. 7,421,752 identifies the fabric of the washload using the ratio of water absorbed by the washload until a steady state is reached to the amount of water released when a pump, recirculating water from below the washload back onto the washload, is stopped. The method requires the step of calculating the amount of water released based on the additional open space in the washer under the new water level and the step of calculating the ratio of the water released to the water absorbed. This approach only applies to recirculation washers in which the washload remains above the water level when the washload is in equilibrium. If a portion of the washload was below the water level, the ratio would also be a function of load size and not fabric alone. While this approach assumes a dry load and requires a flow meter to accurately calculate absorbed water, the amount of water released is independent of the wetness of the washload at the start of the wash. Approximately a 1 minute pump pause is required to allow the rate at which water is released to stabilize at near zero to get a ratio indicating the fabric of the washload lengthening the wash cycle because the method does not teach or account for the fact that the water level rise is nonlinear. It looks at strictly the magnitude of the water released once the level has stabilized. Since the exponential time constant varies with washload composition if a shorter time period was used, the amount of water released would be a function of the time period adding to identification inaccuracy. Further an extended period is necessary to minimize the error caused by the fact in the first seconds after the pump is paused the rise in water level is not a function of washload composition alone. Several factors such as water in transit from the pump and water dripping off the drum and tub significantly alter the water level immediately after the pump is paused. These factors have a greater impact on small loads than large loads, producing errors when fabric is identified by a fixed ratio of absorption and release of water as taught in U.S. Pat. No. 7,421,752.

U.S. Pat. No. 9,243,987 uses the change in density of a washload when water is added. While the method can be performed at two wetted states, it assumes the washload is dry at the start and determines washload wetness based on the amount of water added to the washload. If the washload is not dry at the start all subsequent wetness will be inaccurate. To get good results this requires a method to accurately measure the amount of water added, raising the cost of the approach.

U.S. Pat. No. 6,861,843 by the present inventor teaches the use of protecting impedance to allow safe detection of fluids using contacts electrically connected to a control and a fluid should the control be directly connected to AC and an operator come into contact with the fluid. The approach has an advantage of cost and when mounted directly to the tub of a washing machine the measured water level is immune to the vertical movement common in low immersion washers.

The limitations of the prior art establish a need for a method that can identify the composition of the washload regardless of the wetness of the washload at the start. Second, it should eliminate either the expense of a flow meter or the inaccuracy of estimated flow rate. Third, the method should be done during normal wash operations if possible. Fourth, if normal operation must be altered the time to identify the washload must be minimized. Fifth, the method should be capable of identifying the initial wetness. And finally, if possible, the cost of monitoring water levels should be reduced.

SUMMARY OF INVENTION

Figure 1:
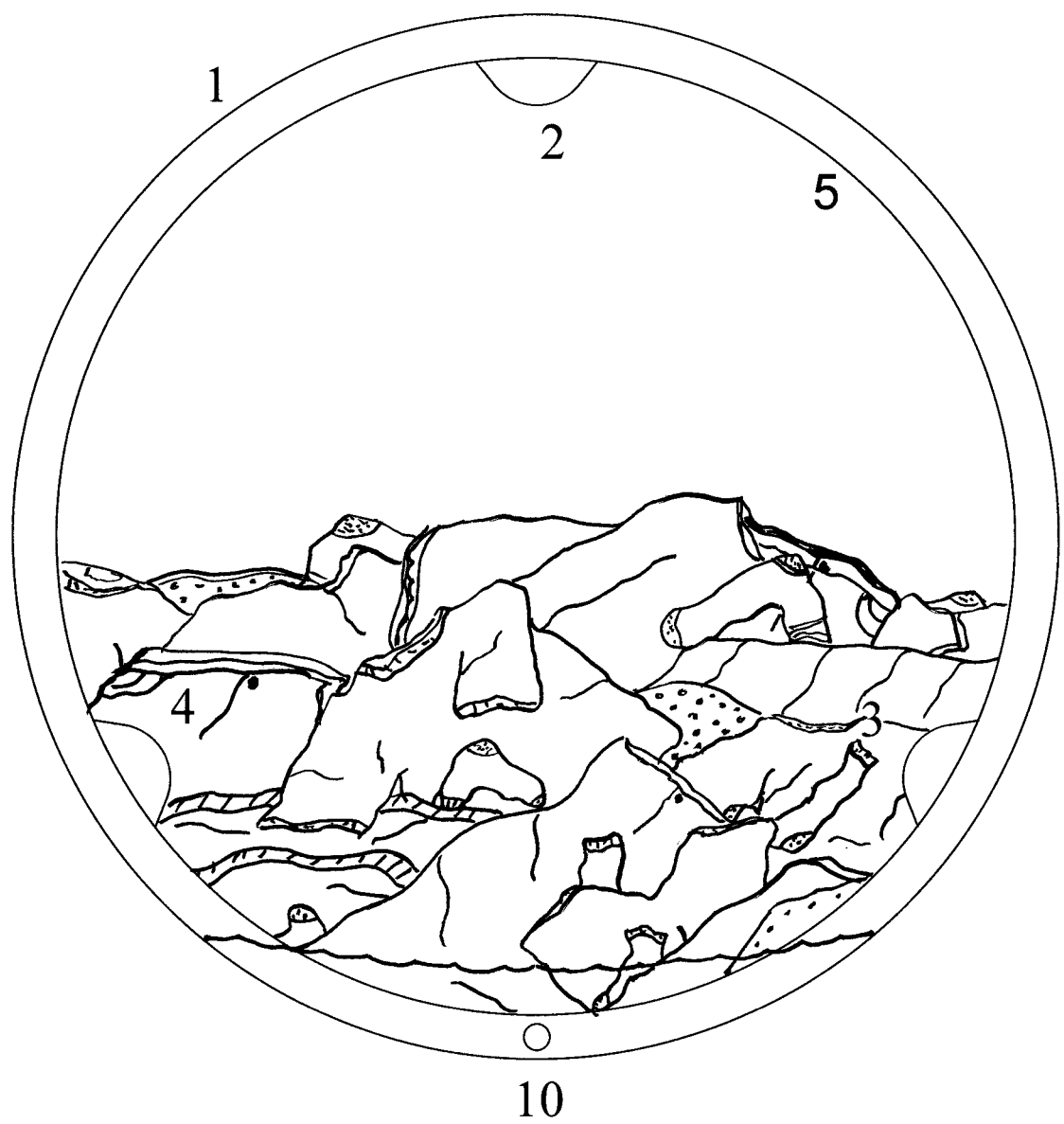
FIG. 1 shows a horizontal axis low immersion washing machine in which a pool of water covers a portion of the washload.

The present invention is a method of determining the properties of a washload in a washer using transitions between modes of washer operation. The transitions alter washload wetness and the water level. The properties include dry weight, fabric and absorption. The properties of fabric and weight define the composition of the washload. Preferably the transitions are performed after the washload has achieved dynamic equilibrium. Dynamic equilibrium occurs when a significant portion of the washload is above the water level in the washer, the volume of water in a washer is constant, and the water level reaches an essentially constant level during a wetting mode of operation. Herein transitions occurring after dynamic equilibrium has been reached are equilibrium transitions. Preferred equilibrium transitions begin or end at the equilibrium water level. Equilibrium transitions alter washload wetness and the water level without a change in the volume of water present in the washer. The change in water level and the corresponding variation in the output of a water level sensor are functions of the weight and fabric of the washload. Test data derived from execution of at least one transition is compared to reference data of known washload compositions to determine the properties of the washload under test.

Equilibrium transitions are preferably transitions that are part of typical washer operation. Equilibrium transitions that lower the water level increase the wetness of the washload typically by starting the movement of the washload through a pool of water using an agitator such as a drum or turning on a recirculation pump to spray the washload with water from pool of water in the washer. Equilibrium transitions that raise water level decrease the wetness of the washload by the stopping the wetting of the washload, such as stopping the movement of an agitator such as a drum or turning off a recirculation pump. It is preferable to use a pair of equilibrium transitions, one raising and the other lowering the water level to further distinguish washload properties and minimize any error due to limitations in reading the water level, particularly when the washload is in motion. Each type of transition is between a unique pair of modes. In a horizontal axis washer in which a portion of the washload is below the water level in the wash tub a typical pair of modes is one, the drum in rotation and two, the drum not rotating. During the pause transition water is pulled out of the washload by gravity raising the water level. The start transition causes the washload to pickup water as it is driven through the pool of water lowering the water level. These transitions occur continuously during typical washer operation which allows testing to be done without interrupting washer operation. Further testing can be done with the water level at or below the lowest water level used in the washing process.

Variations in the output of a water level sensor in response to transitions are invariably nonlinear except in the rare case when the sum all factors affecting the variation produce a short term linear variation. Nonlinear variations require more than 2 points to be defined. Herein when 3 or more points of a variation are used, all 3 points are included in identifying properties by detecting the nonlinear nature, if any of the variation. Test data is compared to reference data of known compositions to identify properties. Test data compiled from the variations may be in the form of raw data where the points are directly compared to reference data corresponding to the same points or in the form processed raw data. Processed test data may be compared to corresponding reference data. In general the raw data of can be combined to produce two variables that can be used to identify most washloads.

While equilibrium transitions depend on the type of washing machine to which the present method is applied, several concepts are generally employed. First, the rate of change at which the water level rises during a pause transition is nonlinear and that 3 or more points of the variation or the ratio of segments formed by the points indicate washload properties. Second, a wetting equilibrium transition and it subsequent variation also varies in a nonlinear fashion with washload composition and that in many cases the initial segment of the variation is a function of the amount of water held by the washload. Third, the difference between washloads is clearer when the analysis focuses on the portion of a variation that occurs after the delay segment common to all types of washloads, this is particularly important when the implementation of the present invention uses short transitions. A delay segment includes the minimum time it takes for sensor output to change in response to a transition; it is primarily caused by the overall system response of the washer to a change in mode of operation. However it may be extended, as required by the type of washer and sensing means, to allow analysis to focus solely on the portion of a variation most directly determined by the washload. For this reason the 3 points of the first concept and the initial segment of the second concept both preferably occur after their respective delay segment. Fourth, dividing ratio of the first concept by the initial segment of the second concept yields a value that increases the difference between fabrics and reduces the error in measuring the steady state water level. Fifth, the initial segment of a pause variation of an equilibrium variation for low immersion washers in which the washload is moved through a pool of water varies with composition for small washloads. Sixth, the total response period, preferably the first point after the delay segment to the last measured point, can be used along with the third concept to identify most washloads. Seventh, a collaborative property is a washload property requiring the use of both an equilibrium transition and a measured property to be identified. Herein a measured property is a washload property determined by a method other than the present invention. And eighth, the initial volume of water held in the washload can be determined using an estimate of a property, determined by a method that assumes the initial state is dry, and the value the same property determined using the present method. For example weighing a washload will produce a weight of the fabric and any water it has absorbed whereas the present method yields the dry weight regardless of the initial wetness. In a similar manner any property can be used.

Equilibrium transitions produce variations with a clear difference between washloads of various compositions. If a transition is performed when the washload is not in steady state, analysis is more complicated as the resulting variation in water level varies with washload wetness which prior to dynamic equilibrium typically is unknown. The present method requires 3 or more points of a nonequilibrium transition to analyze a washload. In general nonequilibrium transitions are the cessation of a change in volume of water present in the washer, such as stopping filling or draining, or any change in the rate of a fill or drain which adds yet another variable, the flow rate into or out of the washer.

The magnitude of any variation is a function of wetness. While the changing rate at which water is absorbed or released is primarily a function of composition the measured rate of change will also be a function of wetness unless the change in wetness is the sole source of the variation in water level sensor. Equilibrium transitions are preferred because wetness is not a variable. Nonequilibrium transitions can be employed when the portion of the resulting variation caused by the change in wetness can be isolated and used as part of the identification. Nonequilibrium transitions allow the present invention to be applied to deep fill washers that do not obtain dynamic equilibrium but rather only reach equilibrium only when washload is submerged. Nonequilibrium transitions also allow the approximate the composition prior to the washload reaching equilibrium in a low immersion washer.

DESCRIPTION OF THE PREFERRED EMBODIMENT

The first two embodiments apply the present invention to the horizontal axis low immersion washer shown in FIG. 1. When the water present in the washer is constant, low immersion washers may obtain a dynamic equilibrium or steady state. Dynamic equilibrium occurs during a wetting mode when the water being added to the washload equals the water draining from the washload causing the water level to become essentially constant. Inside tub 1 is drum 5 which serves as an agitator that moves a washload when rotated with the help of elevators 2, 3 and 4. Near the bottom of tub 1 is outlet 10 which connects to the water level sensor 40 shown in FIG. 2. The level sensor 40 in FIG. 2 uses conducting contacts 21-26, which are encased in non-conducting plastic sleeves 31-36, respectively at all but the lowest level, to sense when water has reached level corresponding to each contact. Sensor 40 is generic to all the embodiments. It includes contact 26 which is only used in the third embodiment. In the other embodiments contact 26 need not be present. The contacts are inside tube 30 which is open to conduit 20 which passes through outlet 10 into tub 1 in FIG. 1. Current through the contacts is limited by protecting impedance (not shown) to prevent shock.

In the first embodiment once the washer is started drum 5 agitates the washload according to the following procedure: first drum 5 is rotated within tub 1 for 10 seconds, second, drum 5 is paused for 6 seconds, third drum 5 is rotated in the opposite direction for 10 seconds and fourth drum 5 is again paused for 6 seconds. In this embodiment drum 5 rotates at 30 RPM during this procedure. Rotation is a wetting mode adding water to the washload as it is driven through the pool of water in tub 1. When the water being added to the washload during rotation equals the water being pulled from the washload by gravity and centripetal acceleration causes the water level to remain essentially steady, the washload is in dynamic equilibrium. The procedure is repeated throughout the fill and washload sensing process. The transitions between rotation modes and pause modes produce variations in water level. These transitions are equilibrium transitions once the washload has reached dynamic equilibrium. The equilibrium transitions are used to determine the composition of the washload. It was found that the variation in water level was essentially independent of the direction of rotation. Disregarding the direction of rotation there are two types of equilibrium transitions: start and pause. In this embodiment the start transition is a wetting transition and the pause transition is a dehydrating transition. At equilibrium the amount of water added to the washload during a start transition equals the amount of water pulled from the washload during a pause transition. Depending on the detected composition of washload, this procedure may also continue during the wash process.

When a wash cycle is started, sufficient water is added to tub 1 so that the washload obtains dynamic equilibrium at a running water level rl which is above the bottom of drum 5 between contact 21 and contact 23. The running water level rl is the measured height of water after drum 5 transitions from a paused state to its rotating state. Once the washload has reached equilibrium rl remains essentially constant during at least the last 5 seconds of drum 5 rotation.

Figure 2:
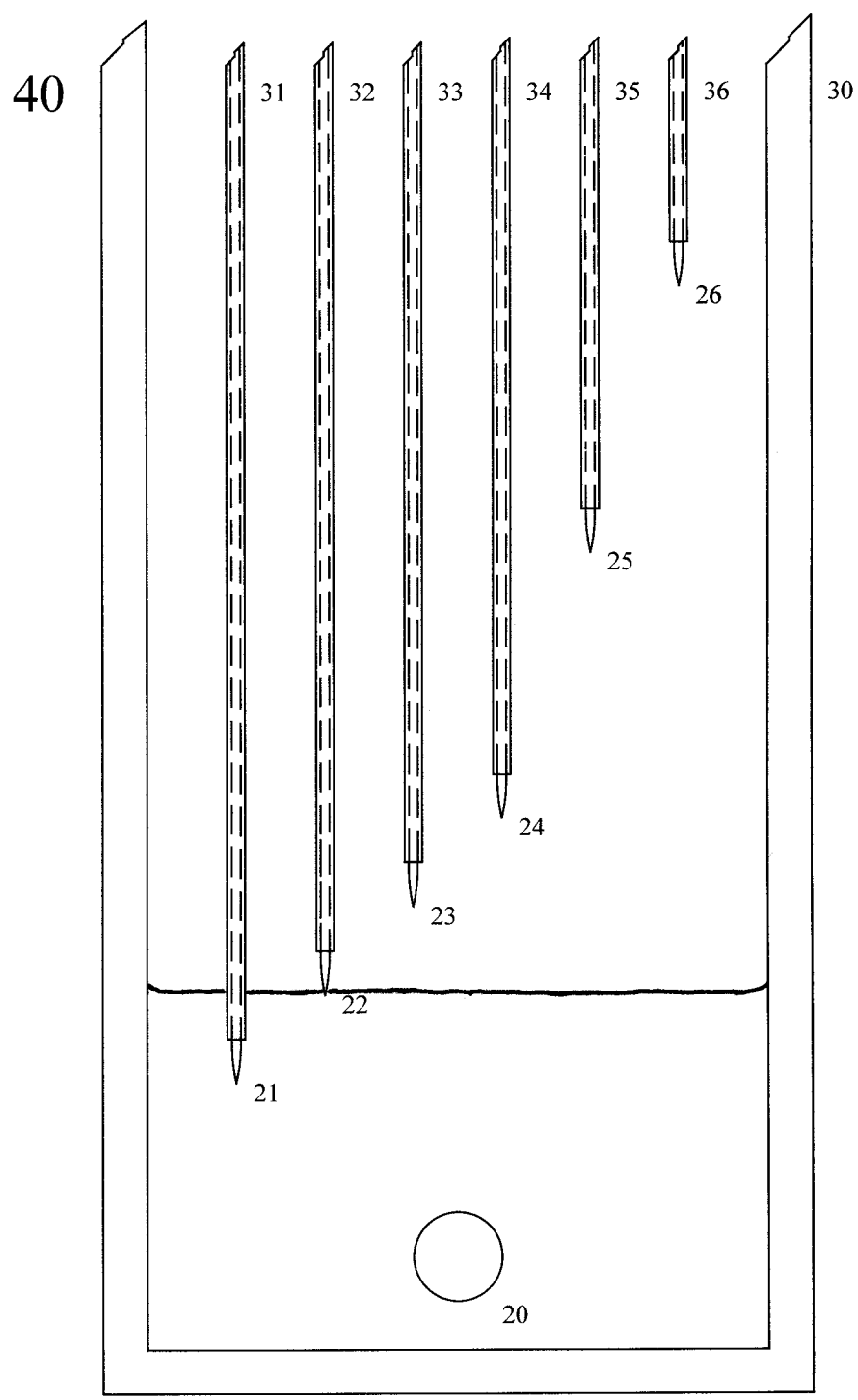
FIG. 2 shows a water level sensor using contacts using a small current through the water to determine the level of water.
Figure 3:
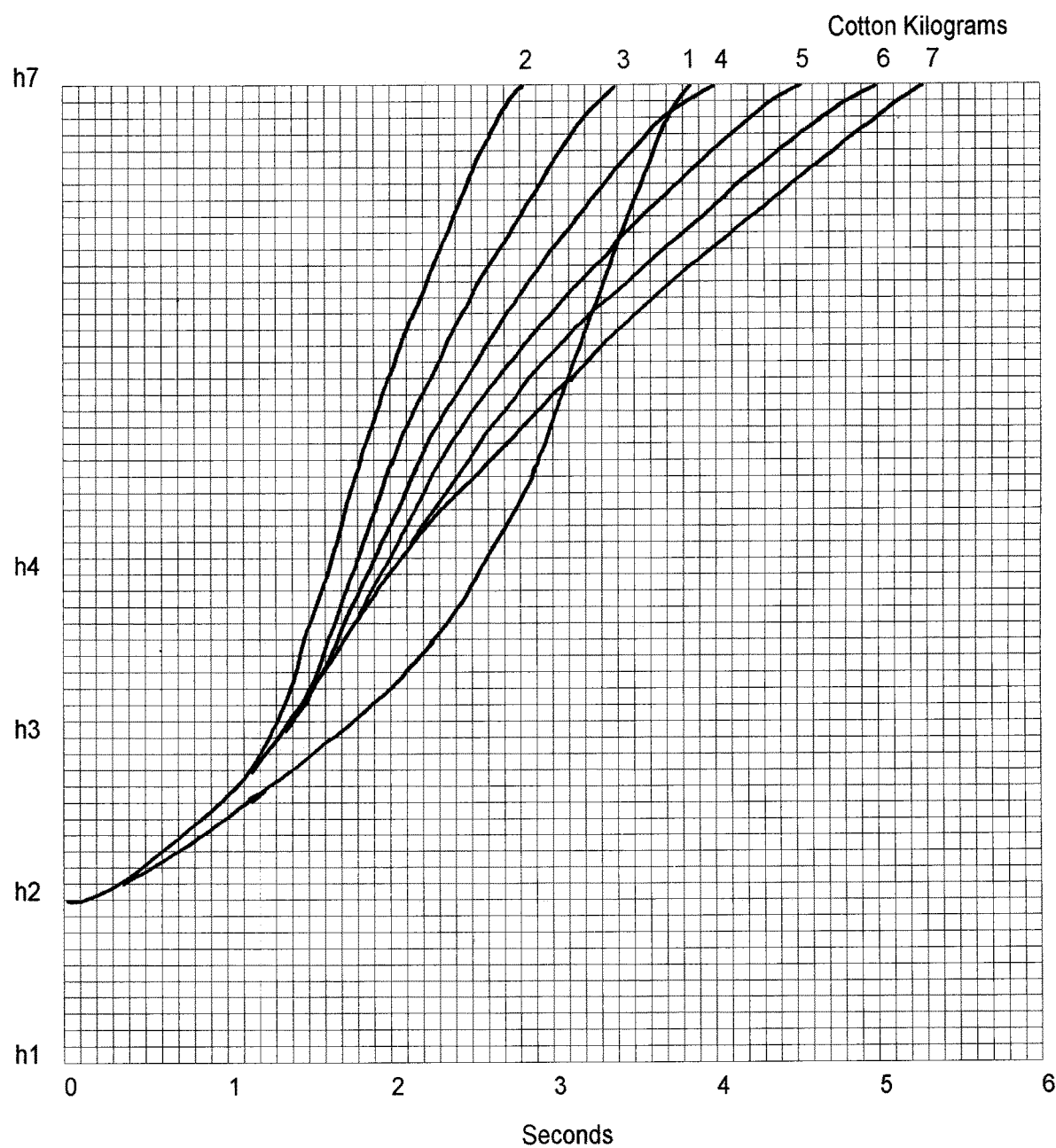
FIG. 3 is a graph of the water level in the water sensor during a pause equilibrium transition for various weights of a cotton washload.
Figure 4:
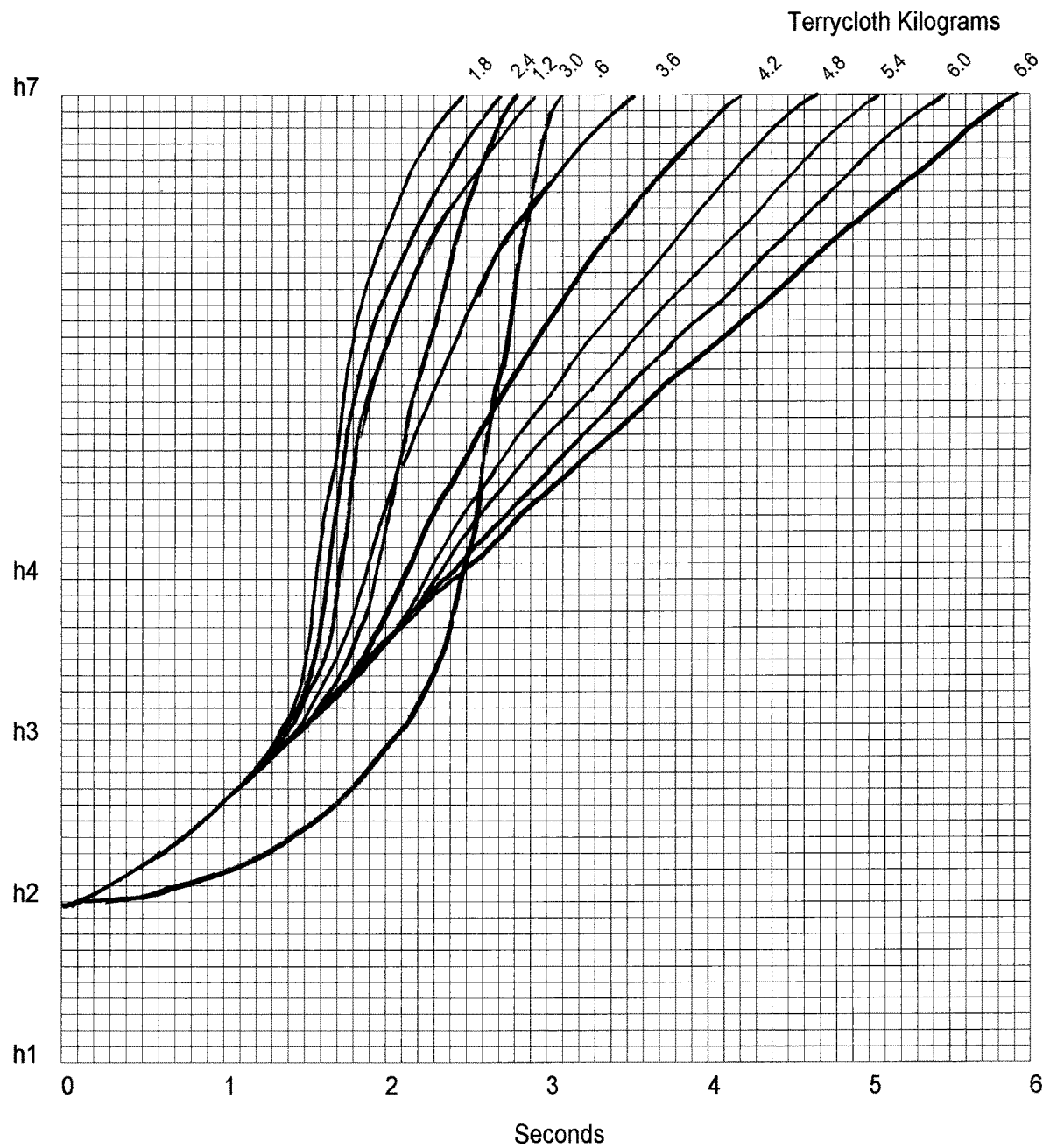
FIG. 4 is a graph of the water level in the water sensor during a pause equilibrium transition for various weights of a terrycloth washload.
Figure 5:
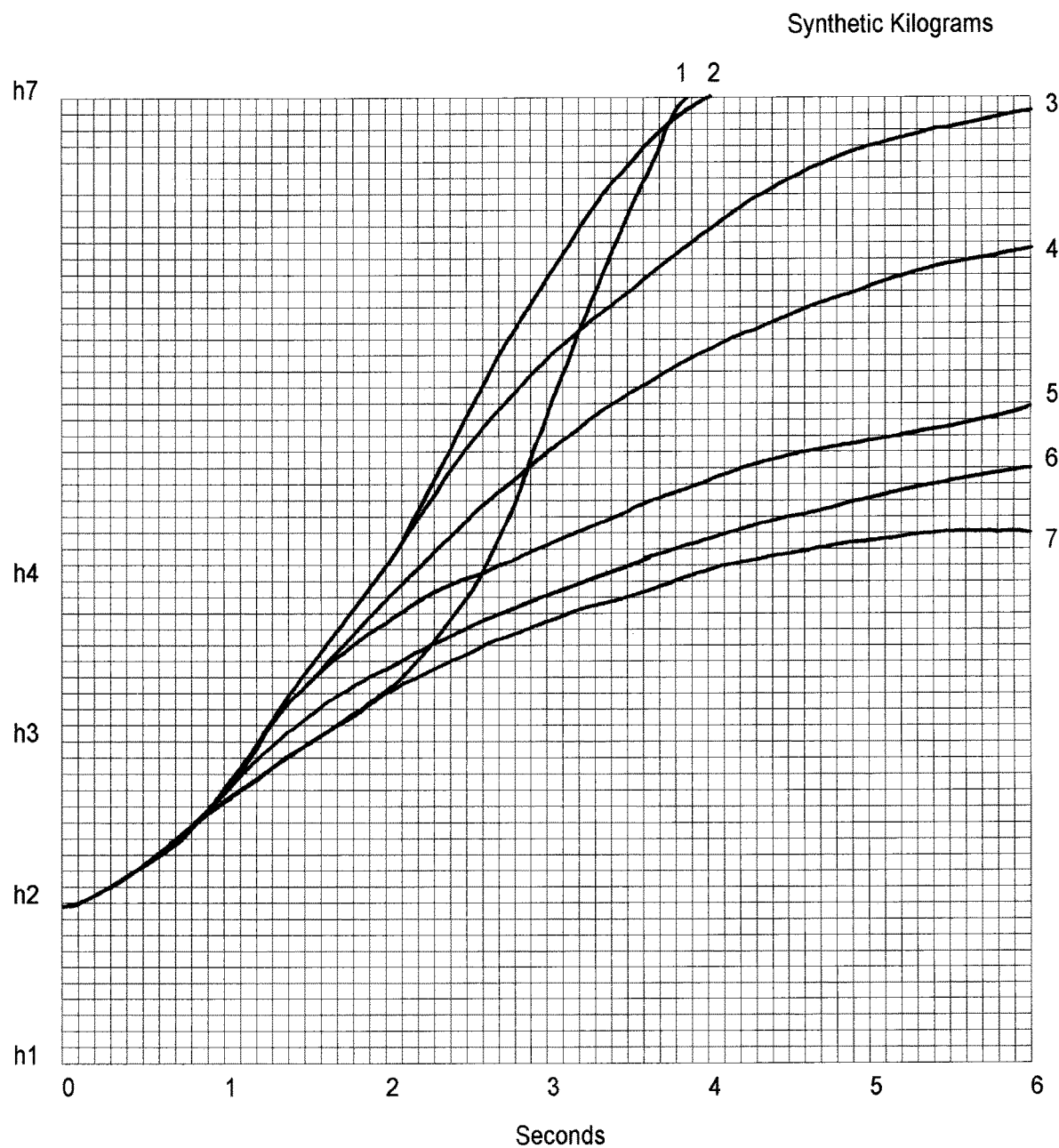
FIG. 5 is a graph of the water level in the water sensor during a pause equilibrium transition for various weights of a synthetic washload.

FIG. 3 shows the change in water level in sensor 40 when drum 5 is paused for different sizes of cotton washloads. Similarly, FIGS. 4-5 show the change for terrycloth and synthetic washloads respectively. FIGS. 3-5 are the average of 12 pause variations and while the times to reached levels; h1, h2, h3, h4, h7 are accurate, the curves between those points are approximations as there are many factors at affecting the rate at which the water rises when drum 5 is paused in this type of washer. Levels h1, h2, h3, h4, h7 in FIGS. 3-5 correspond to contacts 21, 22, 23, 24, and 25 in FIG. 2 respectively. The vertical distance between the lowest points of contacts 21 and 22, 22 and 23, 23 and 24 is 0.7 mm. The distance between contacts 24 and 25 and 25 and 26 is 2.1 mm. The running water level rl is measured in units of 0.7 mm. The water level is 1, 2, 3, 4 and 7 when the water level is at h1, h2, h3, h4 and h7 respectively. However, a reading of 1 indicating that h1 is the only contact covered means that rl is between 1 and just under 2; therefore rl is approximated by adding 0.5 level to the level indicated by sensor 40. For example, if 12 pause variations have 6 variations with a sensor output of 1 at the onset and 6 variations with an output of 2, the average of these rl(i)s is 6×(1.5+2.5)/12 or 2. FIGS. 3-5 are an average of multiple pause variations produced when the test washload is in a steady state of wetness and rl is 2.

The times t1(i), t2(i), t3(i), t4(i) and t7(i) of each pause variation are the times required to reach levels h1, h2, h3, h4 and h7 respectively. Times t1, t2, t3, t4 and t7 are the average t1(i), t2(i), t3(i), t4(i) and t7(i) respectively. These times include the system delay which is approximately 0.7 seconds or 0.1 sec less than 1st, the minimum observed time for the water reach the next contact when drum 5 is paused for those variations that begin with an rl(i) below rl. These variations take the shortest time to reach the first level above rl which is about 0.8 seconds for all loads above 1.5 kg. After 1st the water level rises at a changing rate which is largely a function of the washload.

Figure 6:
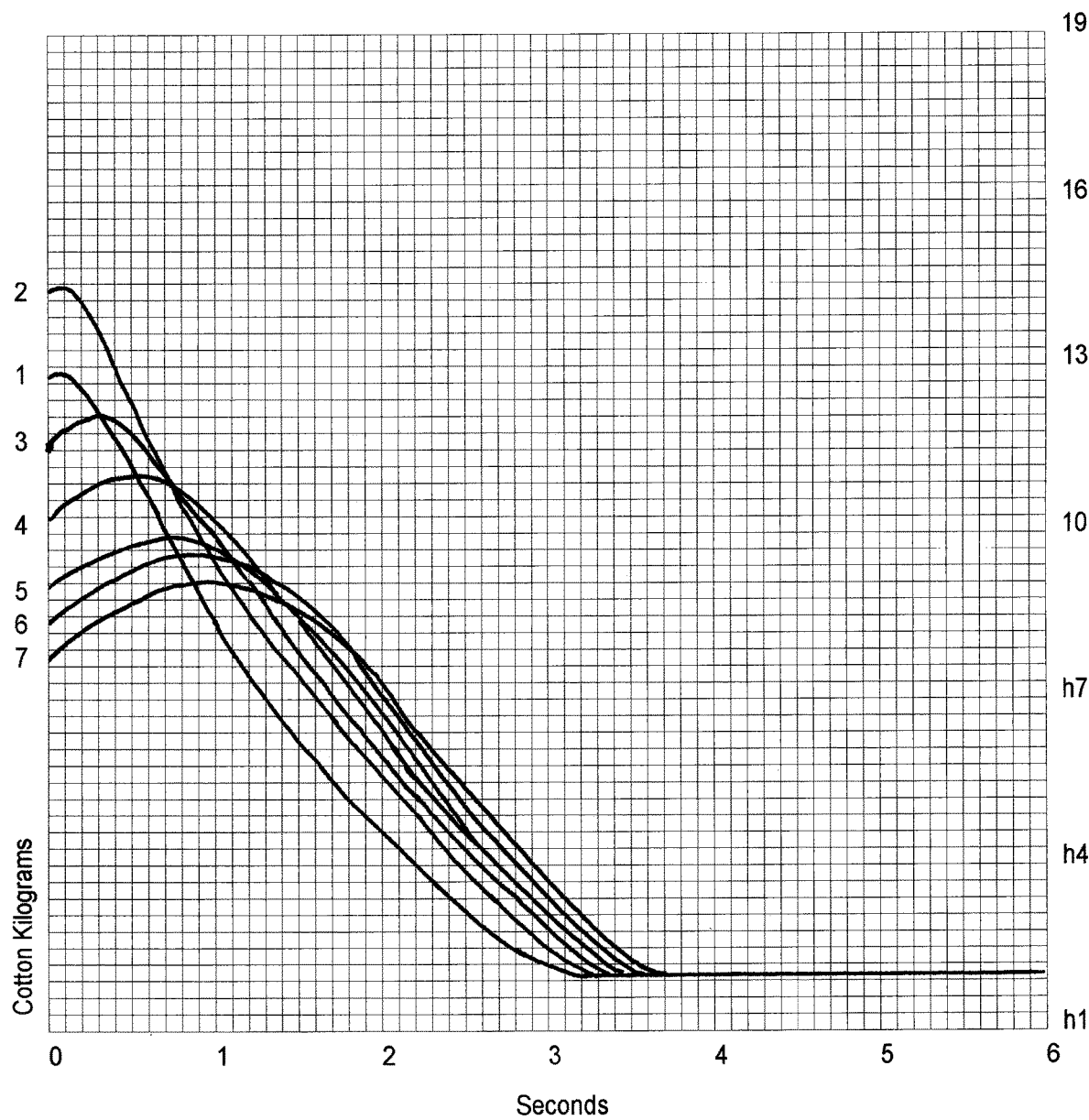
FIG. 6 is a graph of the water level in the water sensor during a start equilibrium transition for various weights of a cotton washload.
Figure 7:
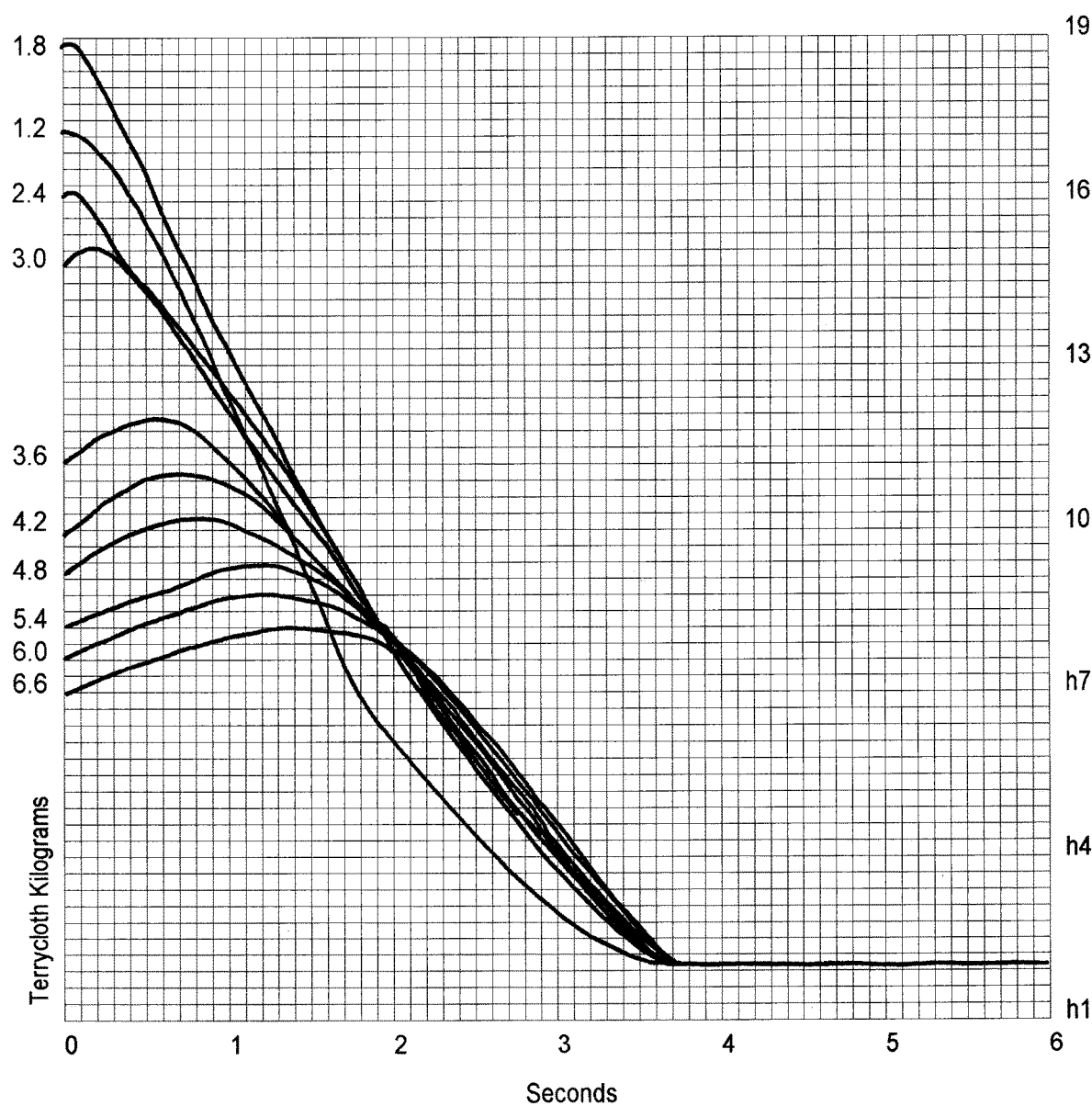
FIG. 7 is a graph of the water level in the water sensor during a start equilibrium transition for various weights of a terrycloth washload.
Figure 8:
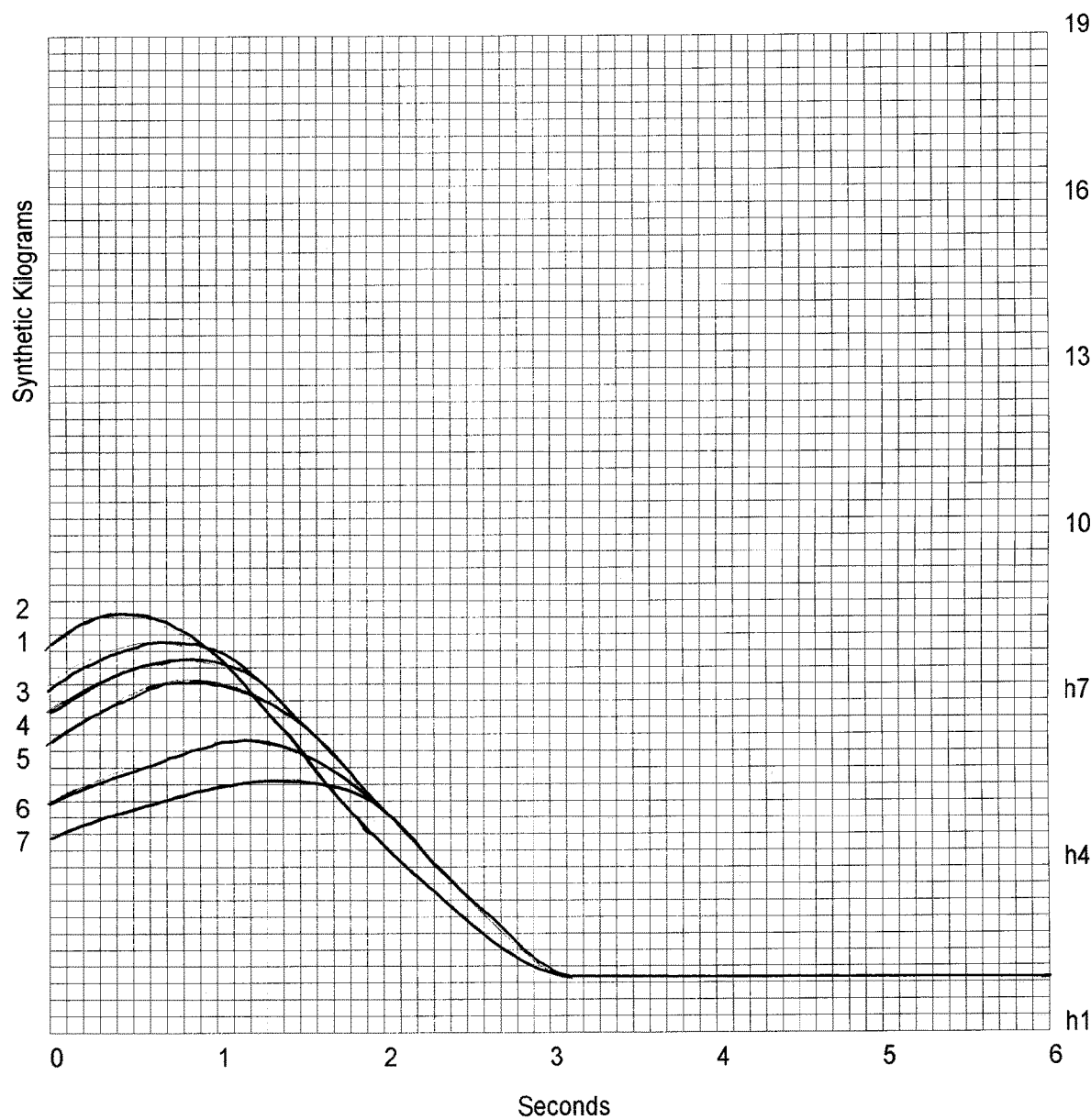
FIG. 8 is a graph of the water level in the water sensor during a start equilibrium transition for various weights of a synthetic washload.

In the first two embodiments variations in the output of water level sensor 40 when drum 5 resumes rotating are also used to determine the composition of the washload in this embodiment. The first six seconds of start variations for different weights of cotton, terrycloth and synthetic are shown in FIGS. 6, 7 and 8 respectively. The curves in FIGS. 6-8 and FIGS. 3-5 were obtained during a series of start and pause equilibrium transitions of drum 5 once the washload had reached dynamic equilibrium during a start transition. In FIGS. 6-8 the slope of the curves is nearly constant after the first contact is uncovered until the water level nears rl which in this case is 2. The start times st7 and st4 are the times it takes the water to fall below levels h7 and h4 respectively. Start time st7 is used for all but the largest loads. Start time st4 is only used when the water level does not reach h7 when drum 5 is paused. Start times are also a function of the composition of the washload.

It is preferred to record multiple pairs of sensor 40 variations with accompanying values of rl(i),1st(i), t4(i), t7(i), during a pause transition and st7(i) or st4(i) during a start transition. The average of rl(i), t4(i), t7(i), yields of rl, t4, t7, respectively. The variable st7 is average of all the st7(i) when h7 was reached during all the recorded pauses. When h7 is not reached during a pause the calculated value of st7(i)=st4(i)−0.9, based on the near constant observed rate of 0.7 mm/0.3 sec level drop once drum 5 is rotating, is included in the average which yields st7. 1st is the average of the 1st(i) from pauses starting with an rl(i) below rl. If 1st is significantly longer than 0.8 seconds for loads weighing more than 1.5 kg there is a fault in the washer, such as drum 5 failing to stop promptly or a flow restriction between tub 1 and the contacts of sensor 40.

For washloads weighing at least 1.5 kg, 1st is about 0.8 seconds. For these washloads the raw data, variables t4, t7, rl and st7 may be used to determine the composition of the washload using one or more tables. Reference values for these variables based on tests of washloads composed of known fabric f and weight w could be stored and compared with the raw data from the washload under test to determine washloads. This approach requires the control to do very little math at the expense of requiring large tables to have a good resolution of f and w.

This embodiment uses a table of just two parameters R" and T calculated from t4, t7, rl and st7 to determine f and w of most washloads. This method reduces the size of the tables needed to determine the washload. More importantly it serves to show more clearly how the water level variations are a function of f and w than may be readily apparently simply by looking at FIGS. 3-8.

Once rl, 1st, t4, 7, and st7 are determined, the first step in calculating R" is to determine R. R is the ratio of the times t7−t4 to t7−1st adjusted for rl using the ratio r of the heights h7−h4 to h7−rl+0.5 as calculated using the following equation:

$$R^x = \frac{t7 - t4}{r \cdot (t7 - 1st)} \tag{1}$$

Where $$r = \frac{h7 - h4}{h7 - (rl + .5)} \quad (2)$$

For weights above 1.5 kg, 1st is about 0.8 seconds and when r is ≥0.5, the exponent x~1.

After the initial tests the inventor discovered that R is a function of f and w and to a lesser extent rl. It was observed that all loads vary with rl, in the narrow range of rl used during testing, in nearly the same way and that it is possible using Table 1 to calculate a ratio R' which is independent of rl. The small effect that rl has on R may have many contributing factors such as the shape of tub 1 and drum 5 which maybe unique to the model of washer, but it appears the principal cause is that the amount of the washload drained varies as water level rises during a pause for this type of washer. The values of r' in were determined empirically based on the results of testing many different washloads at each rl in Table 1.

TABLE 1

| rl | .5 | .75 | 1 | 1.25 | 1.5 | 1.75 | 2 | 2.25 | 2.5 | 2.75 | 3 | 3.25 |
|---|---|---|---|---|---|---|---|---|---|---|---|---|
| r | .5 | .52 | .54 | .57 | .6 | .63 | .67 | .71 | .75 | .8 | .86 | .92 |
| r' | .53 | .55 | .57 | .59 | .61 | .63 | .67 | .7 | .73 | .77 | .78 | .84 |

Figure 9:
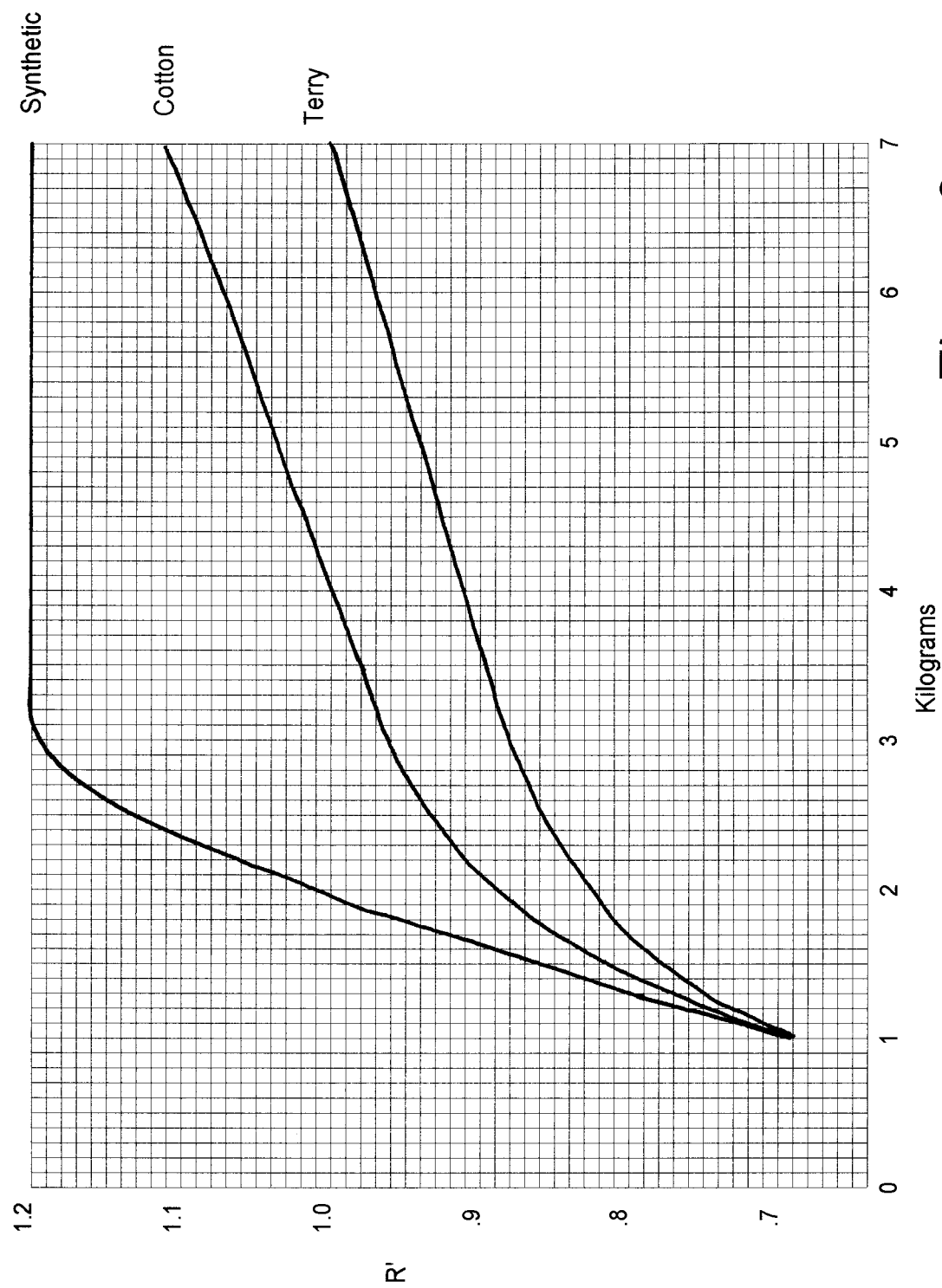
FIG. 9 is a graph of R' the ratio of segments of a pause equilibrium transition for washloads composed of various weights of all cotton, all terrycloth and all synthetic fabrics.

The plot of R' is shown in FIG. 9 as calculated using the following equation:

$$R' = \frac{t7 - t4}{r' \cdot (t7 - 1st)} \quad (3)$$

Calculating R or R', the ratio of the slope of segments of a variation, is similar to computing the base, B of an exponential using a ratio of two adjacent equal length segments. R' is the ratio of a portion of a segment over the whole segment adjusted for the size of the portion. R' differs from 1 by approximately half the growth or decay rate associated with B. R' has several advantages over B: first, it allows the use of unequal segments which allows the fewer contacts to be used in the preferred water sensor, second, the response is a function of many factors with varying time constants using R' smoothes out the differences in response by including the bulk of the response in both the numerator and the denominator, third, R' worked best when both water level rising and falling transitions are used, yielding a parameter that varies little over a range of weights for each fabric. When the present invention is implemented using an analog level sensor, such as a pressure sensor, many points of the variation may be measured including points at fixed levels and points at fixed times. Clearly that there are many methods of analyzing nonlinear responses that can be used in applying using the present invention to a wide variety of washing machines by using 3 or more points of a variation.

Figure 10:
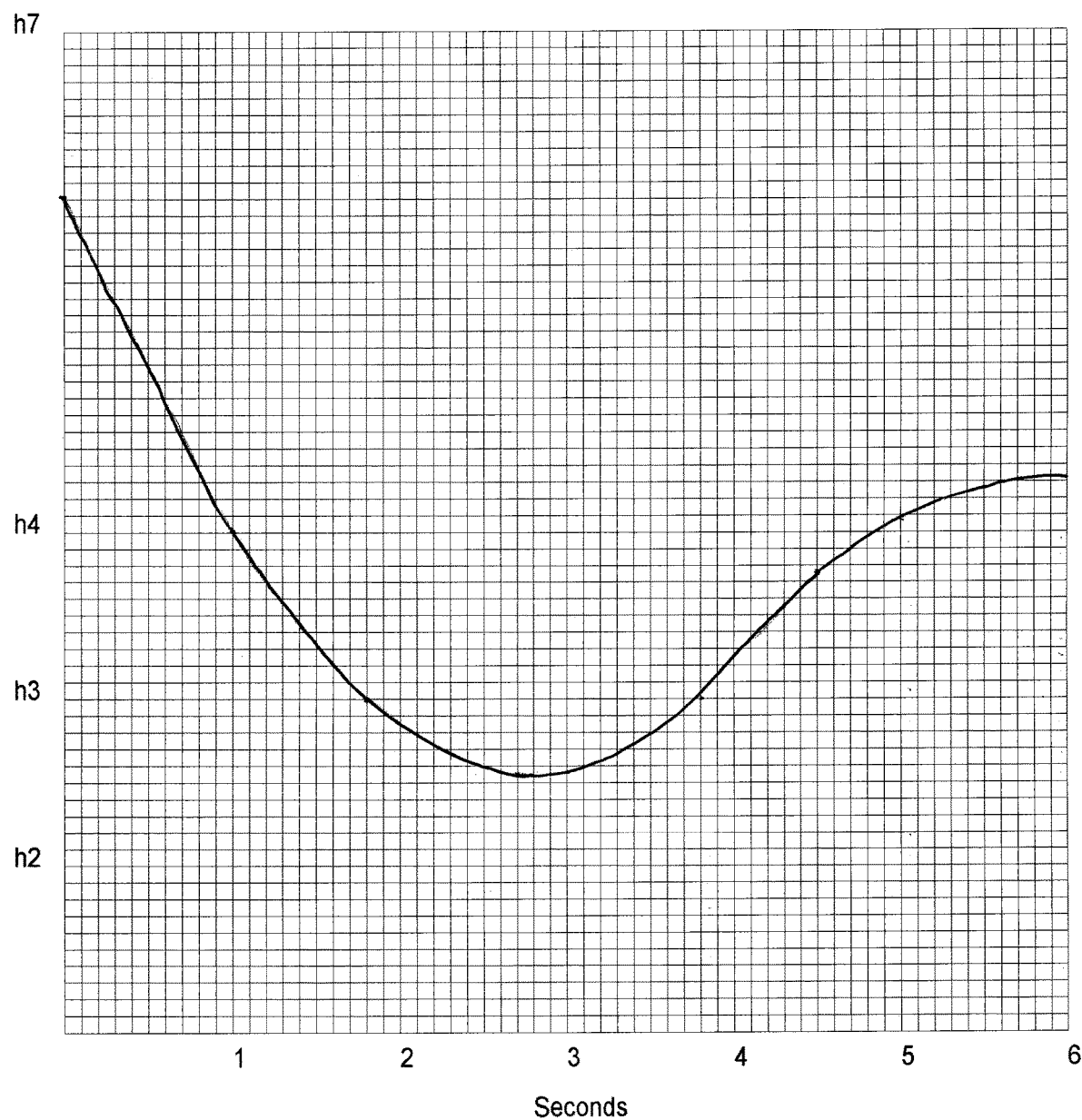
FIG. 10 is a graph of the water level in the water sensor during a pause transition when the washer contains no washload.

Looking at FIG. 9, R' is less than 1 for many washloads. This means that the rate at which the water rises actually increases with time in the measured portion of the variation. This indicates that water released from the washload is not the sole factor determining the rate at which the water rises. The excitation of the pool of water in the bottom of tub 1 by the rotation of drum 5 raises the height of water in sensor 40 higher than the water level in tub 1. When drum 5 is paused the water level in sensor 40 gradually returns to the water level in tub 1 as the sloshing of the water in tub 1 subsides. This effect causes a reduction in the rate of the rise in water during the variation to a drum 5 pause. The reduction itself is a function of f and w that is most apparent at the beginning of a pause. The water level in sensor 40 returns to the water level in tub 1 more quickly for small washloads than for large washloads. Subsequently, this effect causes the R' for each fabric to vary much more with the weight of the washload than expected. In small loads the reduction in the rate at which water rises in sensor 40 is sufficient to lengthen the time to rise from 1st to t4 to such a degree that R' is less than one. FIG. 10 plots water level change when drum 5 stops when there is no washload. In this case the water level goes down rather than up when drum 5 stops as water returns from sensor 40 to tub 1. The water level drops for about 2.8 seconds before slowly rising as water returns to the bottom of tub 1 from the surfaces of drum 5 and tub 1 above the water line. Water returning to the bottom of the washer having been lifted by drum 5 during rotation but not held in the washload is another factor in the rate at which the water level rises in pause transitions.

The next step in determining the composition is to calculate St. St is the time, st7 adjusted to an rl of 2. St is a function of f and w of the washload and rl. For the range of rl used during testing St, the value of st7 at an rl of 2, which is the median operational water level, can easily be calculated. St is calculated using the equation:

$$St = st7 - 0.3 \cdot (rl - 2) - 0.7 \quad (4)$$

The constant 0.7 sec is the minimum response time of the system or the system delay to the signal to start drum 5 rotation; it is removed to focus on the part of the variation that differs between washloads. Observing FIGS. 6-8 yielded the quantity 0.3(rl−2). In FIGS. 6-8, the slope of the water level decline was essentially the same over the bulk of each variation for the range of fabrics and weights tested. That slope is 0.3 seconds per 0.7 mm or 1 level. Of course the multiplier could be adjusted should a washload have a significantly different slope. St is plotted in FIG. 11.

Figure 11:
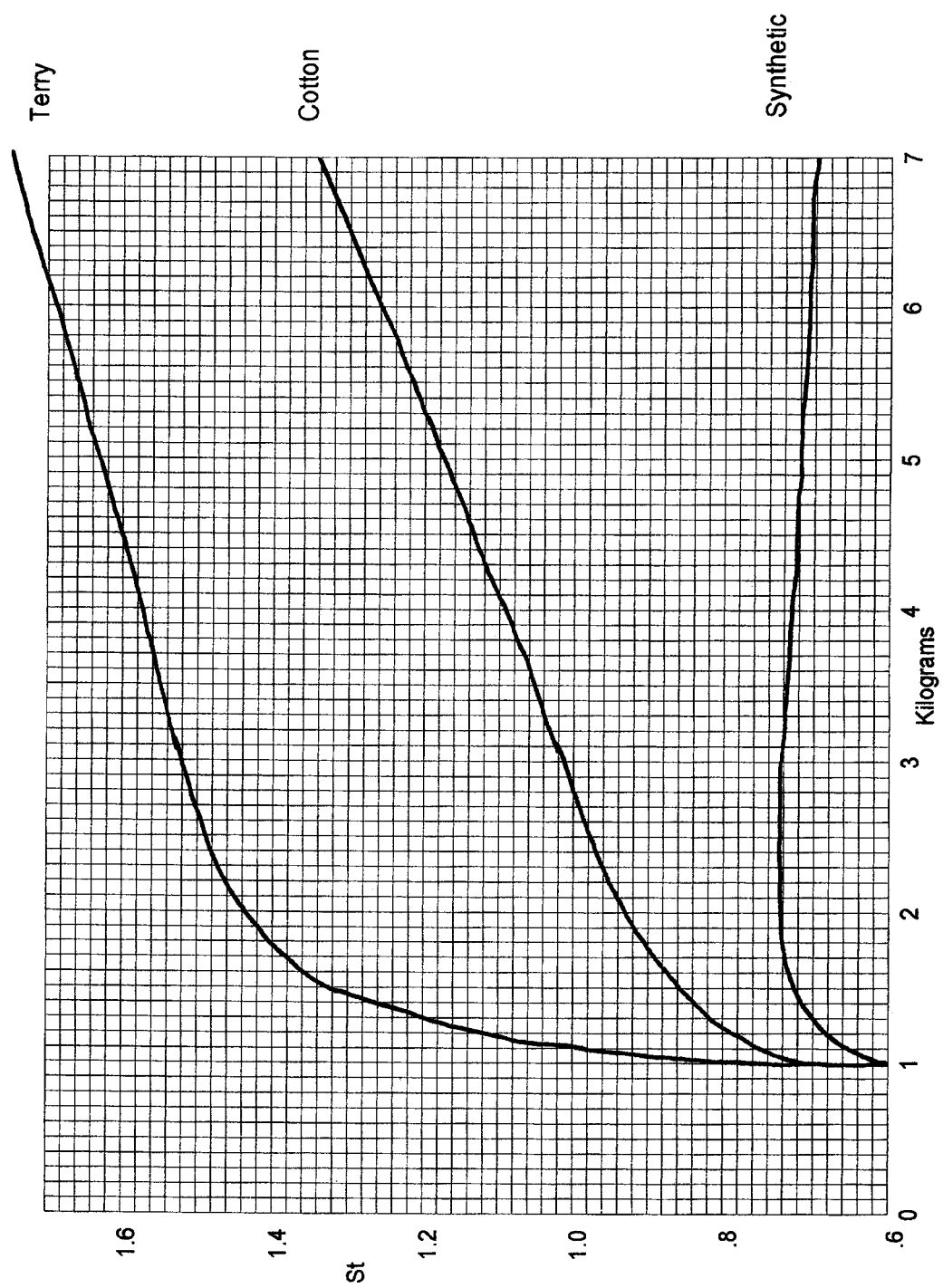
FIG. 11 is a graph of St, the time for the water level in the sensor to fall below h7 during a start equilibrium transition for washloads composed of various weights of all cotton, all terrycloth and all synthetic fabrics.

The curves of R' and St shown respectively in FIGS. 9 and 11 for each fabric vary with weight in much the same way. A washload composed of cotton has an R'~40% greater than a washload of terrycloth with the same St. Similarly, St of a terrycloth load is ~40% greater than a cotton load with the same R'. Rather than store both R' and St, both values are divided St yielding R" and 1 respectively. This has the added benefit of reducing the effect of any error in measuring rl because any error will either make both St and R' larger or both smaller.

$$R'' = \frac{R'}{St} \quad (5)$$

Figure 12:
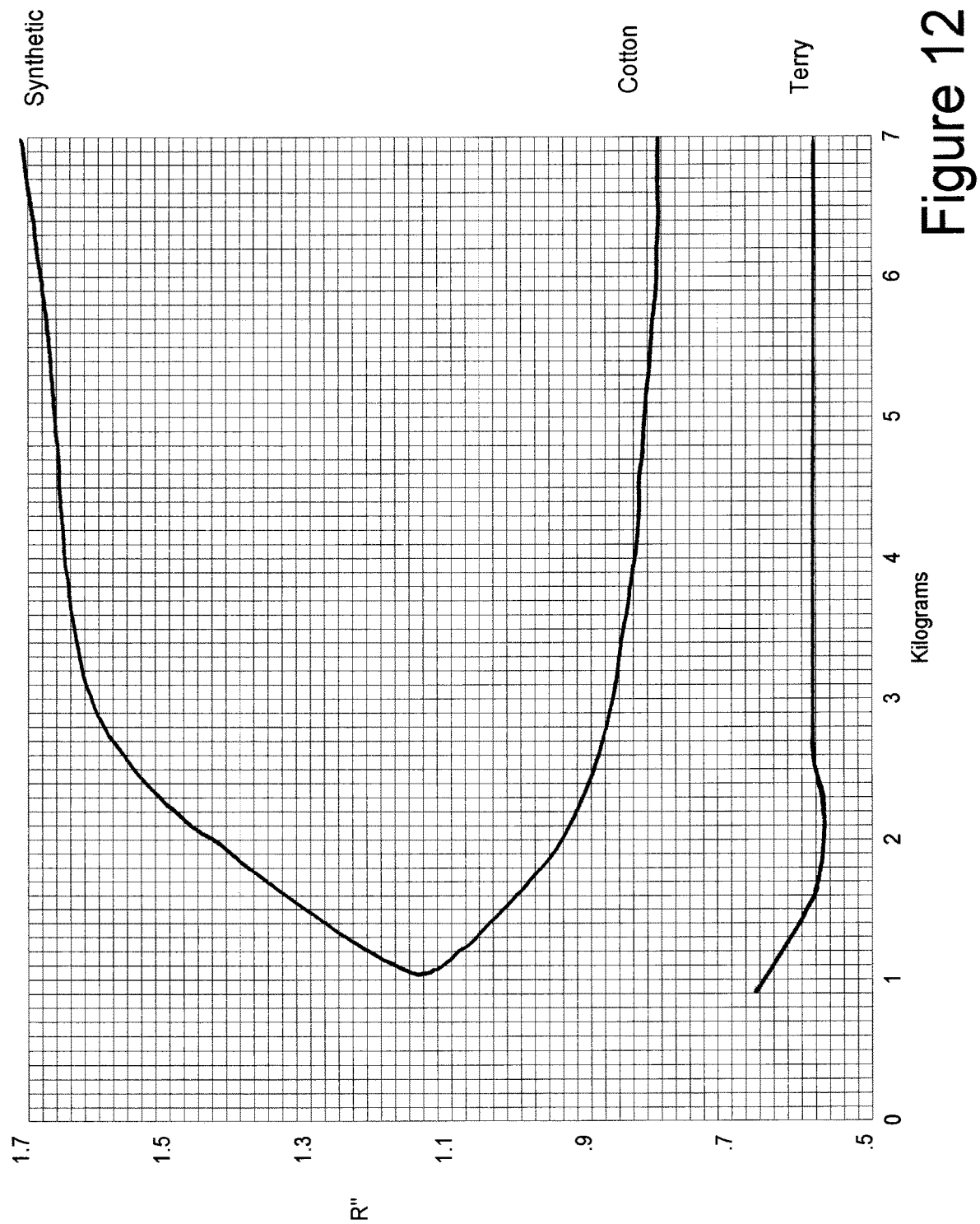
FIG. 12 is a graph of R" the ratio R"/St for washloads composed of various weights of all cotton, all terrycloth and all synthetic fabrics.

The results for R" are plotted in FIG. 12. It is one of two parameters this embodiment uses to determine the washload. R" is a function of f and w at an rl of 2. There is a clear difference between fabrics for loads above 1 kg, though the difference is not fixed. It is considerably greater than if R' or St were used alone. Washloads composed of other fabrics or a mix of fabrics can be plotted in a similar manner.

R″ alone gives a fairly accurate indication of f of larger washloads. To determine the dry weight w and further determine f of a washload, a second parameter T, the time t7−1st when rl is 2, is calculated. The time, t7 corresponds a rise in water level of 5 levels or 3.5 mm. If rl is not 2, T must be adjusted to approximate the time to rise 5 levels. The first step in adjusting T is to estimate the rate of water level rise near h7 assuming the water is rising as an exponential with a ratio, B between adjacent equal length segments of the variation. As mentioned B is related to R′ and can be approximated using the following equation:

$$B = 2 \cdot R' - 1 \qquad (6)$$

Dividing h4-h7 into three equal segments of 0.7 mm, the time to rise each of the segments may be found using the following equation:

$$t7 - t4 = K \cdot (1 + B + B^2) \qquad (7)$$

The length of time for the water to rise the last 0.7 mm prior to h7 is $KB^2$ and the time to cover the 0.7 mm above h7 is $KB^3$. To calculate T following equation is used:

$$T = t7 + X \cdot (rl - 2) - 1st \qquad (8)$$

Where $X = KB^2$ when rl<2 and $X = KB^3$ when rl>2.

The approach using equations 6-8 to find T yielded good results for the range rl and R′ observed during testing. If desired, B may be calculated more precisely using rl and R′ as it is a mathematical function of both and independent of washload composition.

Figure 13:
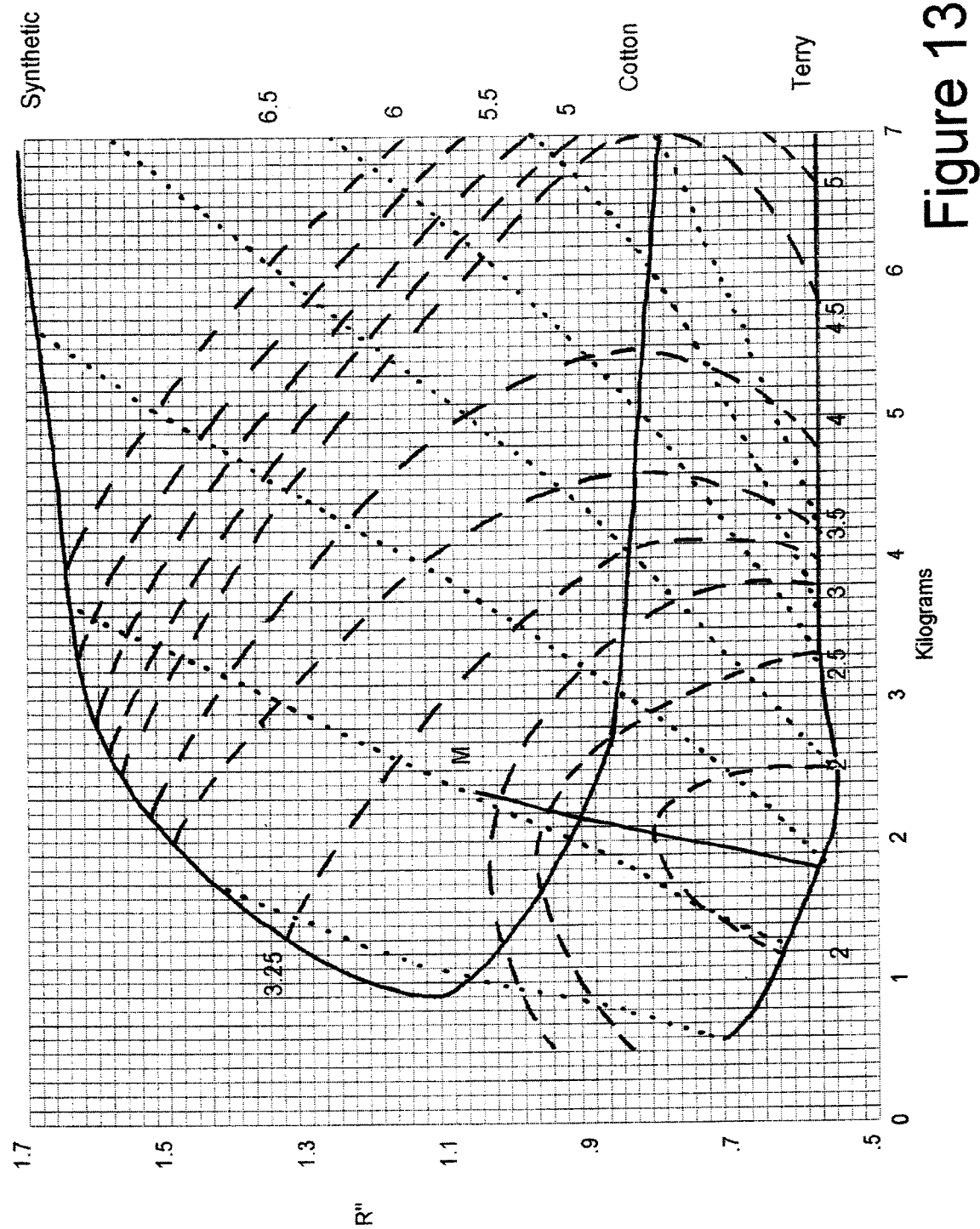
FIG. 13 is a graph of R" and T, the time from 1st to t7 adjusted for rl and absorption, a for washloads composed of various weights of all cotton, all terrycloth and all synthetic fabrics.

FIG. 13 is the plot of R″ versus T. Solid lines represent values of R″. Dashed lines are lines of equal values of T. Dotted lines represent washloads in equilibrium at an rl of 2 holding equal amounts of water or equal absorption, a. If desired, a can be used to determine load equivalency of cotton or any other fabric. While load equivalence does not define a washload as clearly as determining f and w, it can be determined by this method if desired. However, using the present method the value of absorption a is independent of washload wetness prior to start of testing, thus allowing accurate readings even if the washload is wet prior to entering the washer.

Figure 14:
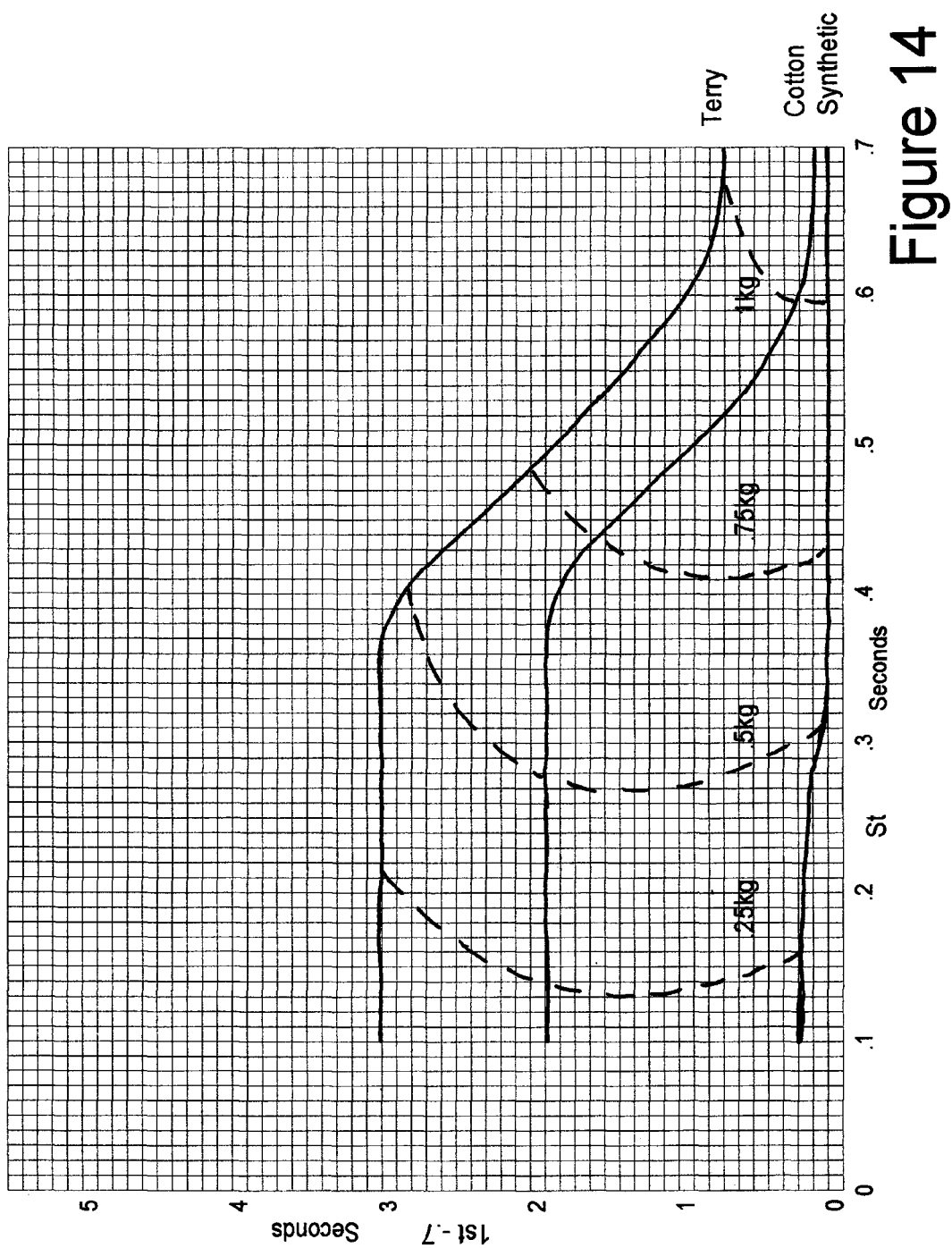
FIG. 14 is a graph of St and 1st–0.7 seconds for small washloads composed of various weights of all cotton, all terrycloth and all synthetic fabrics.

Looking at FIG. 13 for small loads there is little if any difference between loads. In fact R″ of cotton and R″ of synthetic are essentially the same for loads 1 kg and smaller. Small loads are defined as any load where testing yields St<0.88 and R′<0.95. When a small load is detected, St and 1st are used to determine washload composition. FIG. 14 shows a plot of 1st−0.7 versus St for small loads. Data representing FIG. 14 is stored in Table A.

Returning to FIG. 13 for loads that are not small, f and w can be uniquely determined based solely on T and R″ when T>2.7 seconds. Table B is a digitized version of this region of FIG. 13. This represents the majority of typical washload compositions. When T is 2.7 seconds or less there are different compositions producing the same pair of values for T and R″. For example, the plot of T=2 crosses the terrycloth line twice, corresponding to either a load weighing 1.2 kg or 2.5 kg load of terrycloth. For this range of washloads two pairs of values of for f and w are stored in Table B—note the pairs are the same if there is only one intersection.

When testing of a washload indicates it is not small and results in a T of less than 2.7 seconds, R′ is used to determine which intersection is correct. If R′ is greater than R′(M), the washload is composed of the larger store values w and f. If R′ is less than R′(M), the washload is composed of the smaller store values w and f. The value of R′(M) shown as line M in FIG. 13 is given by the following equation:

$$R'(M) \simeq 0.3 \cdot (R'' - 0.58) + 0.82 \qquad (9)$$

Equation 9 is used to calculate R′(M) rather than storing the value of R′(M) for each value of R″ used in Table C to reduce the size of Table C. The constants 0.3, 0.58 and 0.82 were determined by empirical analysis of the data amassed from testing washloads of known f and w.

Figure 15:
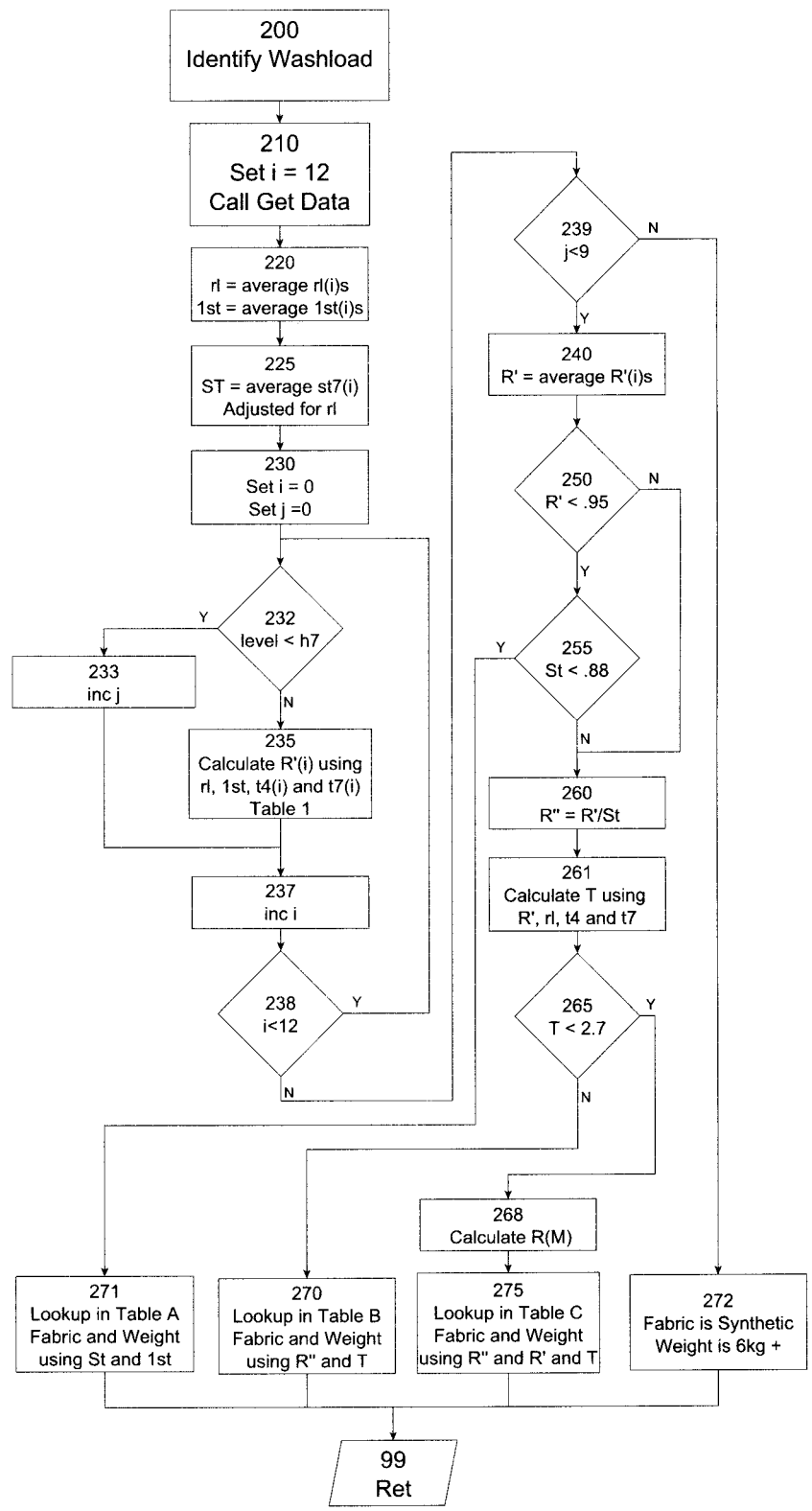
FIG. 15 is a flowchart of the routine used to identify washload properties for the washer in FIG. 1 when the position of the drum when stopped during testing is random.
Figure 16:
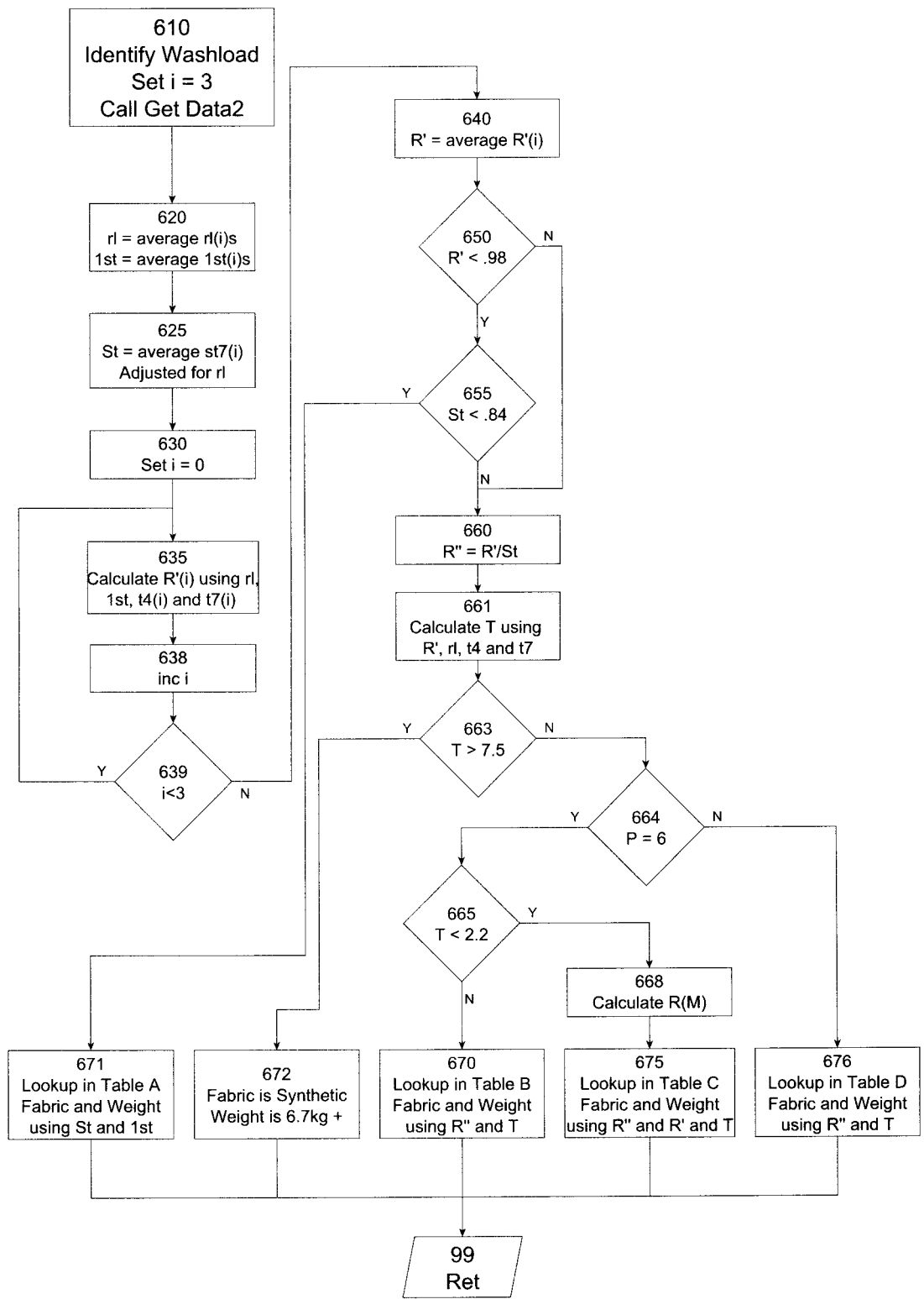
FIG. 16 is a flowchart of the routine used to identify washload properties for the washer in FIG. 1 when the position of the drum when stopped during testing ensures that the elevators of the drum are above t7.

The flow charts in FIGS. 15-16 use the hardware in FIGS. 1-2 for the first and second embodiments respectively. In this type of washer when drum 5 rotates the washload is driven through a pool of water increasing the washload wetness and lowering the water level. When drum 5 is stopped washload wetness decreases and the water level rises. While the hardware is the same for the first two embodiments, operation of drum 5 is different. In FIG. 15, the position of drum 5 when stopped is random. This was the normal operation of this type of washer prior to the development of the present invention. This means the elevators 2-4 may or may not be below the level of contact 25. As the elevators 2-4 are hollow the position of drum 5 affects the water level variation when drum 5 is paused. The flow chart in FIG. 16 is based on pauses in which drum 5 is stopped with all elevators 2-4 above the level of contact 25. Equations 1-9 are used in the methods shown in the flow charts in FIGS. 15-16 for the first two embodiments. Tables A, B and C are unique for each embodiment and are determined by the testing of known compositions of f and w using the method shown for each embodiment shown in FIGS. 15-16 respectively.

In the first embodiment, the routine in FIG. 15 is called once the average wetness of the washload has reached a steady state and drum 5 has been rotating for 10 seconds. Step 210 sets i=12 and calls the subroutine Get Data, shown in FIG. 17a. Get Data records 12 pairs of pause and start variations or responses in the output of water sensor 40. Step 20 records rl(i) the level corresponding to the highest contact in the pool of water. Step 30 pauses drum 5 for 6 seconds and records 1st(i), the time for water to reach the first contact above rl(i), and the times t4(i) and t7(i), which are the times for water to reach h4 and h7 respectively, for each pause.

Step 40 starts and rotates drum 5 for 10 seconds and records st7(i) the time for the water level to fall below h7 unless the water level was below h7 at the start of rotation. Then Step 40 sets st7(i)=st4(i)−0.9 for each start transition of drum 5 rotation. Step 55 decrements the number of pauses and starts needed to be completed. Step 60 sends control to Step 20 to record another pause variation and start variation unless i is zero, in which case control returns to Step 220 of FIG. 15 via Step 99.

Step 220 computes rl and 1st. Records having a rl(i) higher than rl are not used in the calculation of average 1st. The average time for the water level to fall below the highest contact covered during the pause St is calculated for the 12 recorded values of st7(i), adjusted for rl using equation 4 in Step 225.

Step 230 clears the counter i the loop to handle all pause variations, and clears j which is used to count the number of pauses during which h7 was not reached. Steps 232-238 form a loop in which each ratio R′(i) of all pause variations reaching h7 is calculated. Step 232 checks if h7 has been reached. If h7 has been reached, Step 235 calculates R′(i) using Table 1 and equation 3. If h7 has not been reached during the pause, Step 233 increments j. In either case Step 237 increments the pointer to the next variation and Step 238 checks if all twelve variations have been processed. Once all twelve pause variations have been handled, Step 239 checks j, the number of variations where level h7 was not reached. If j exceeds 8 control is sent to Step 272 where the washload is defined as a washload of at least 6 kg of synthetics, and Step 99 returns control to the main program. If there are at least 4 variations during which h7 was reached, Step 240 calculates R' the average of the R'(i)s.

Together, Steps 250 and 255 check if the load is a small load. If R'<0.95 and St<0.88 in Steps 250 and 255 respectively, the washload is a small load and operation continues to Step 271. In Step 271 the f and w of the load are looked up in Table A using St and 1st. Afterwards Step 99 returns control to the main program.

If either R'≥0.95 or St≥0.88, the washload is not small and Step 260 is executed calculating R" using equation 5. Next, Step 261 calculates T, the time required for the water level to rise 3.5 mm using equations 6-8. If Step 265 finds T≥2.7, Step 270 uses R" and T to look up f and w of the washload in Table B. Afterwards Step 99 returns control to the main program.

If T<2.7, the washload is in a region in which R" and T may have more than one intersection. In this case Step 268 calculates R'(M), medium R' based on R" using equation 9. Then Step 275 looks up the f and w of the washload using R", T and R' in Table C. Afterwards Step 99 returns control to the main program. Table C has two pairs of values of f and w for each combination of R" and T, if R'≥R'(M) the first pair f and w is used. Conversely if R'<R'(M) the second pair of f and w is used.

While the first embodiment uses the present invention alone to determine properties of a washload it is also possible to combine data from the present invention and a measured property to jointly determine a collaborative property. Again a measured property is a property of the washload determined by some method other than the present invention including both machine measured and user entered. In the first embodiment, if weight was the measured property (the collaborative property) fabric could be determined using the intersection of R" and the vertical grid line in FIG. 13 representing the weight measured by the alternative method. Similarly, if absorption was the measured property, the collaborative property fabric could be determined using the intersection of R" and the dotted line in FIG. 13 representing the absorption measured by the alternative method. If the measured property is a function of the initial wetness of the washload and the initial wetness is not identified, the collaborative property will be incorrectly calculated when the washload is not dry when placed in the washer.

The wetness of the washload prior to the start of a wash cycle can be determined using either a measured property or a collaborative property that assumes an initial dry state as an estimate of the same property determined by the present invention. For example, in the first embodiment if the weight, measured by the increase in weight of the tub assembly when the washload is added, is an estimate of the weight of the washload subtracting the weight w indicated by the vertical grid line at the intersection of R" and T in FIG. 13 from the estimate of weight yields the weight of the water held in the washload prior to the start of the wash cycle. If absorption is estimated by using the amount of water needed to bring the washload to equilibrium, subtracting the estimate from the absorbency, a indicated by the dotted line at the intersection of R" and T in FIG. 13 yields the volume of water held in the washload prior to the start of the wash cycle. Typically it is the initial wetness of the washload that is unknown. However, the amount of water in the washload at anytime prior the washload reaching equilibrium can be found. This information may allow any method of washload identification assuming a dry washload at the start to be adjusted to correctly identify washload properties.

The second embodiment, shown in FIG. 16, uses just 3 start and 3 pause variations to determine washload composition. It is called once washload wetness is in equilibrium and the drum 5 rotation period has reached 10 seconds. In this embodiment drum 5 is always paused in a position in which all of the elevators 2-4 are above h7 during composition testing. This eliminates the volume of water inside an elevator as a variable, reducing the average t7 and the difference between variations for the same washload. Height, h7 is reached in less than the normal pause time which remains 6 seconds, except for large loads of all or nearly all synthetics. While the pause is a minimum of 6 seconds in this embodiment, it is extended to 7.5 seconds when h7 has not been reached in 6 seconds. If h7 has not reached within an average of 7.5 seconds the washload is assume to be least 6.7 kg and composed of all synthetic.

Figure 17:
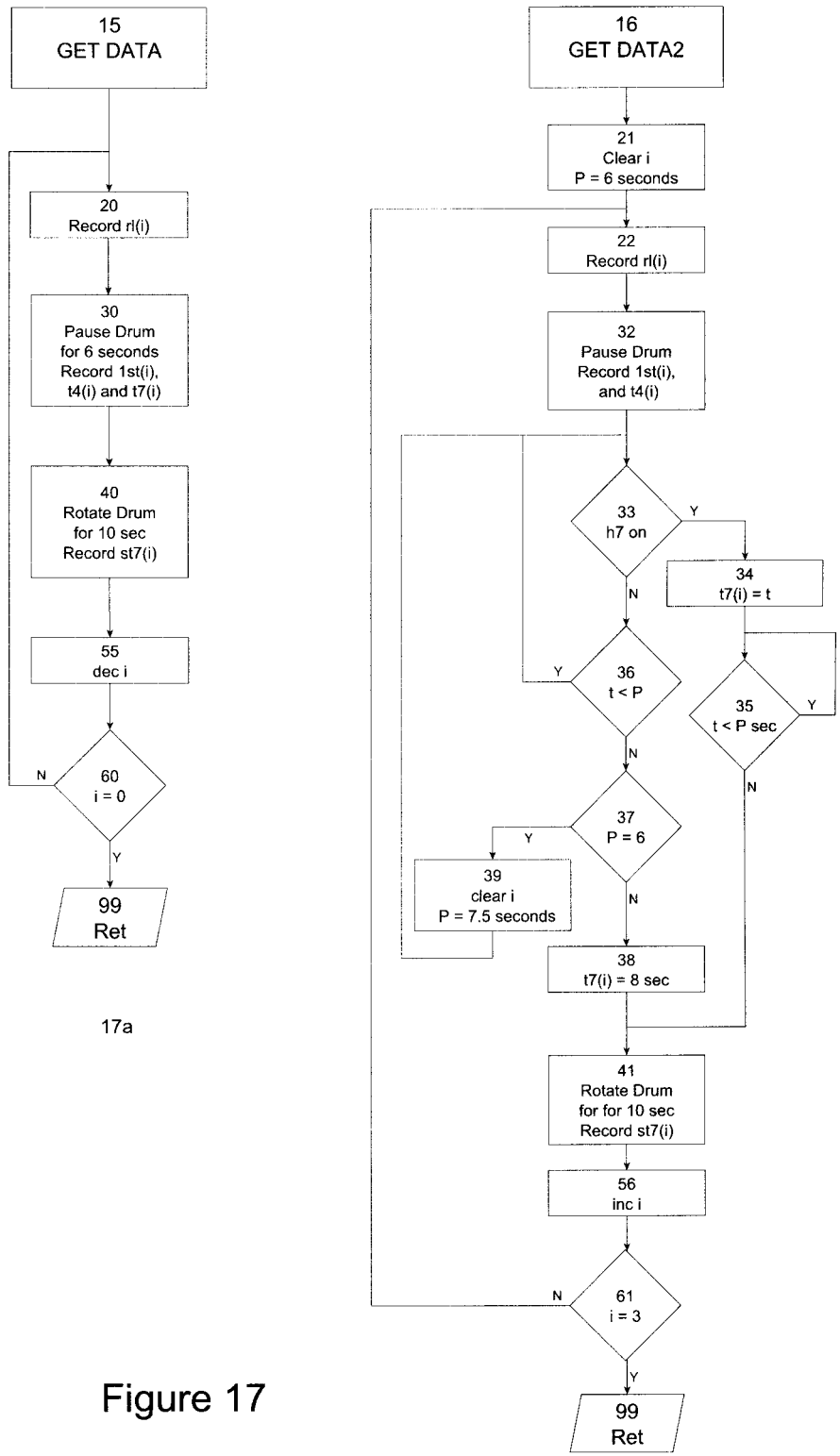
FIG. 17 is a flowchart of the routines used to initiate transitions and record the responses of the water level sensor to the transitions.

Step 610 sets i=3 and calls the subroutine Get Data2, shown in FIG. 17b. Get Data2 records the pause and start variations of water sensor 40, to three pairs of drum 5 pauses and starts. Get Data2 pauses drum 5 for 6 seconds unless h7 has not been reached in 6 seconds, in which case the pause is lengthened to 7.5 seconds and three pause variations of 7.5 seconds recorded. If h7 is not reached in 7.5 seconds, t7 is set to 8 seconds.

When Get Data2 is called, Step 21 sets the default pause time P to 6 seconds and zeroes the number of variations. Steps 22-61 form a loop to record 3 pairs of equal length pauses and 10 second rotations. Step 22 records the running level rl(i) prior to a pause. Step 32 pauses drum 5 and records 1st(i) and t4(i) and once h4 has been reached sends control to Step 33 which checks if h7 has been reached. If h7 has not been reached, Step 36 determines if the length of current pause time t is less than the P which is 6 seconds, unless a prior variation took longer to reach h7, in which case P is 7.5 seconds. The program remains in a loop checking if h7 or P has been reached. If P is reached prior to h7, Step 37 checks if P is still 6 seconds. If so, Step 39 sets P to 7.5 seconds and resets the number of variations to zero to ensure all recorded variations are for the same period of time. If P is 7.5 seconds prior to the execution of Step 37, t7(i) is set to 8 seconds in Step 38. Then Step 41 rotates drum 5 for 10 seconds and st7(i)=st4(i)−0.9 is recorded.

In the more common case where h7 is reached prior to drum 5 before P is reached, Step 34 sets t7(i) to t the current length of the pause. Step 35 then continues the pause until t=P, when Step 41 rotates drum 5 for 10 seconds and records st7(i). Once drum 5 is rotated for 10 seconds Step 56 increments the number of recorded pairs of variations. If Step 61 finds 3 pairs of variations have not recorded, Step 22 is executed and the loop is repeated. If 3 pairs of variations have been recorded, Step 99 returns control to the back to the routine in FIG. 16.

Returning to FIG. 16, Step 620 computes rl and 1st. Variations having a rl(i) higher than rl are not used in the calculation of 1st. The average time for the water level to fall below the highest level covered during the pause St is calculated for the 3 recorded values of st7(i) adjusted for rl using equation 4 in Step 625.

Steps 635-639 form a loop in which the ratio of each pause variation R'(i) is calculated. Step 630 sets the loop to handle all 3 variations when drum 5 is paused. Step 635 calculates R'(i) using Table 1 and equations 2 and 3. Step 638 increments the pointer to the next variation(i) and Step

639 checks if all 3 pause and start variations have been processed. Once all three R'(i)s have been calculated Step 640 calculates R' the average of the R'(i)s.

Together, Steps 650 and 655 check if the load is a small load. If R'<0.98 and St<0.84 in Steps 650 and 655 respectively, the washload is a small load and operation continues to Step 671. In Step 671 $f$ and $w$ of the load are looked up in Table A using St and 1st. Afterwards Step 99 returns control to the main program.

If either R'≥0.98 or St≥0.84, the washload is not small and Step 660 is executed calculating R" using equation 5. Then Step 661 calculates T, the time required for the water level to rise 3.5 mm using equations 6-8. If T>7.5, Step 663 sends control to Step 672 which identifies the load as being composed of synthetic and weighing at least 6.7 kg. Then Step 99 returns control to the main program.

If T<7.5 seconds in Step 663, the routine proceeds to Step 664. If P, the length of the pause, is not 6 seconds, Step 676 is executed using R" and T to look up f and w of the washload in Table D. Then Step 99 returns control to the main program. If P is 6 seconds, Step 665 is executed. If T≥2.2, Step 670 is executed using R" and T to look up f and w of the washload in Table B. Then Step 99 returns control to the main program. If T<2.2, the washload is in a region in which R" and T may have more than one intersection. In this case, Step 668 calculates R'(M) based on R" using equation 9. Then Step 675 looks up f and w of the washload using R", T and R' in Table C. Afterwards Step 99 returns control to the main program. Table C has two pairs of values of f and w for each combination of R" and T if R'≥R'(M) the first pair fabric and weight is used. Conversely, if R'<R'(M) the second pair of f and w are used.

In addition to the washer shown in FIG. 1, the present invention can be applied to both horizontal and vertical axis recirculation washers which use a pump to spray the washload with water present in the washer. In these types of washers when the spray is paused washload wetness decreases and the water level rises. Conversely, when pumping is resumed wetness increases and the water level falls. A recirculation horizontal axis is shown in FIG. 18.

Figure 18:
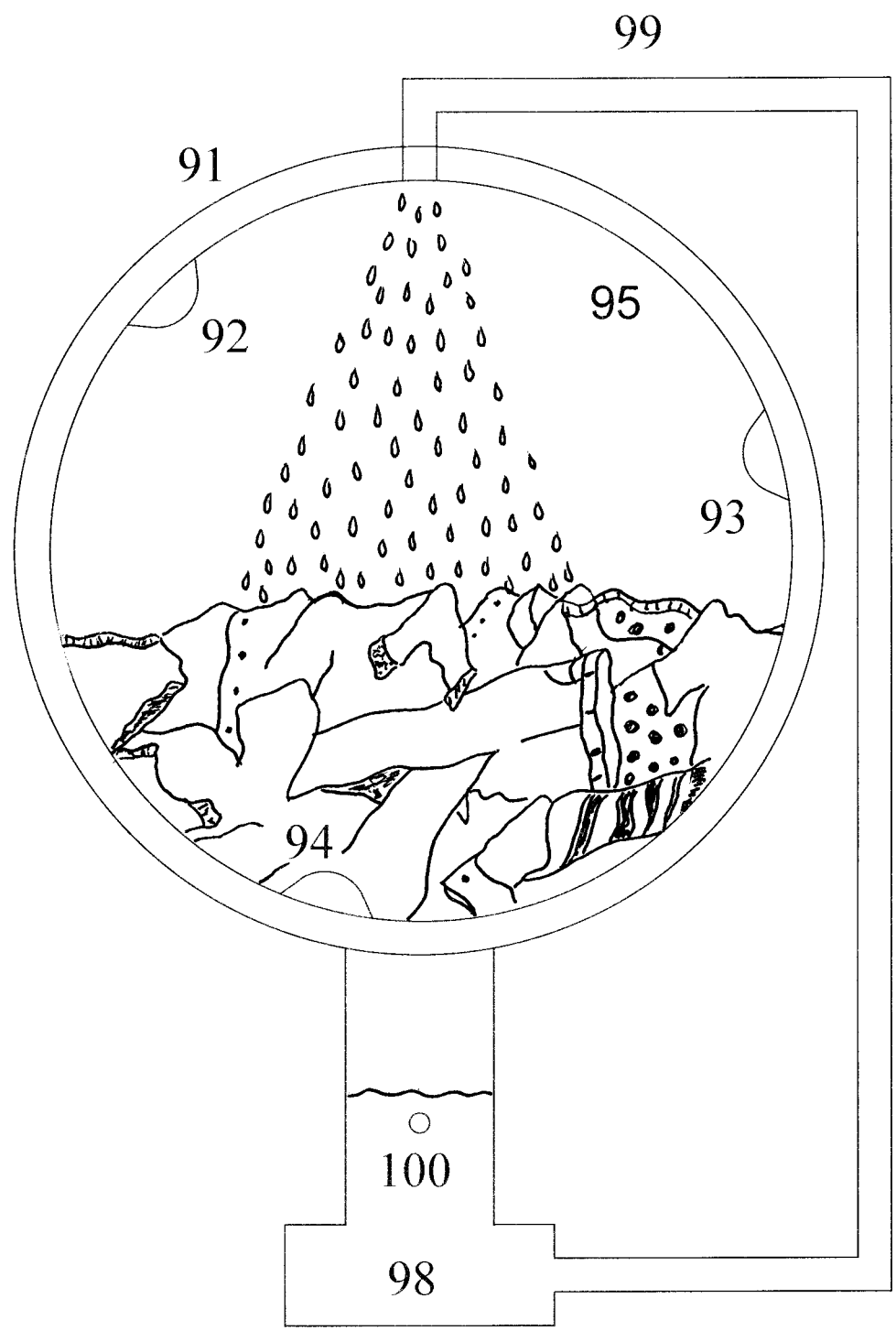
FIG. 18 shows a horizontal axis recirculation washing machine in which the water level remains below the washload in normal operation.

The washer in FIG. 18 includes a tub 91 and a drum 95 with elevators 92, 93 and 94, which are capable of holding a washload. When drum 95 rotates, elevators 92-94 assist in rotating the washload. This washer also includes pump 98, which draws water from the pool of water present in the washer and pumps it up through the return line 99 to the top of tub 91 and sprays the washload. Near the bottom of tub 91 is outlet 100, which connects to the water level sensor 40 shown in FIG. 2.

The inventor observed that in a typical horizontal recirculation washer if the running level is just below drum 95 during its normal operation, either of the first two embodiments could be applied by testing the washer with the spray turned off during testing. This works because when the spray is off, the water level will rise above drum 95. It will remain above drum 95 until the spray is resumed because movement of drum 95 will not lower the water level below that of drum 95. The first two embodiments may also be applied to vertical axis machines that have a mechanical means to move the washload in and out of a pool of water, with the spray off and the water level partially covering the washload, though accuracy of the results may not be as accurate as vertical axis non immersion washers which do not typically move the washload into and out of the pool of water in a washer as thoroughly as their horizontal counterparts.

While the methods of the first two embodiments could be used, the preferred method of testing recirculation washer is done with the water level always below the washload thereby simplifying the determining process in many ways. First, the spray is sole method of increasing the wetness of the washload with water present in the machine. Second, the volume of water needed to reach any level during a pause does not change with the position of drum 95 as was the case in the first embodiment. Third, this eliminates the movement of the rotation of drum 95 or other agitator from directly affecting the reading of sensor 40 which be caused by the excitation of the pool of water by the rotation and the change in the amount of the washload in the bottom of drum 95 when it is rotating versus when drum 95 is stopped. And fourth, because the entire washload remains above the water level throughout testing, the same amount of the washload is drained throughout the variation unlike in the first two embodiments. Testing is much the same for either axis orientation and is similar to the first two embodiments basically using the same equations.

In this embodiment a new method of handling the range of water level change from the smallest to the largest is presented. In the first embodiment, washloads with a very small range fail to reach h7 during a 6 second pause. Rather than extending the pause to ensure all washloads reach h7. Washloads not reaching h7 in 6 seconds at least 33% of the time were identified as weighing at least 6 kg and being composed of synthetics. In the second embodiment the paused time is lengthened to a maximum of 7.5 seconds to reach h7 to better determine the weight and fabric up to 6.7 kg of synthetics. In the third embodiment, the range of water level change during an equilibrium transition is larger than either of the first 2 embodiments. To handle the greater range, sensor 40 includes contact 26 at height h10 in the third embodiment.

As noted in the prior art, the quantity of water release for all fabrics increases with weight in a recirculation washer. This eliminates the need to handle small and very small loads differently than other loads. As a result, all loads are identified using T and R". If h10 is not reached in at least one pause, the equations remain the same as in the first two embodiments and a Table B unique to washer is used for identification. When h10 is reached during all three pauses the load is large and the equations are modified to use t10, st10 and Table E is used to determine these larger loads. When Table E is used, equations 1, 2, 3, 4, 7 and 8 must be modified to used h10 the height of contact 26, t10 the time to reach h10 during a pause, and st10, the time to fall below h10 when the spray is restarted.

Figure 19:
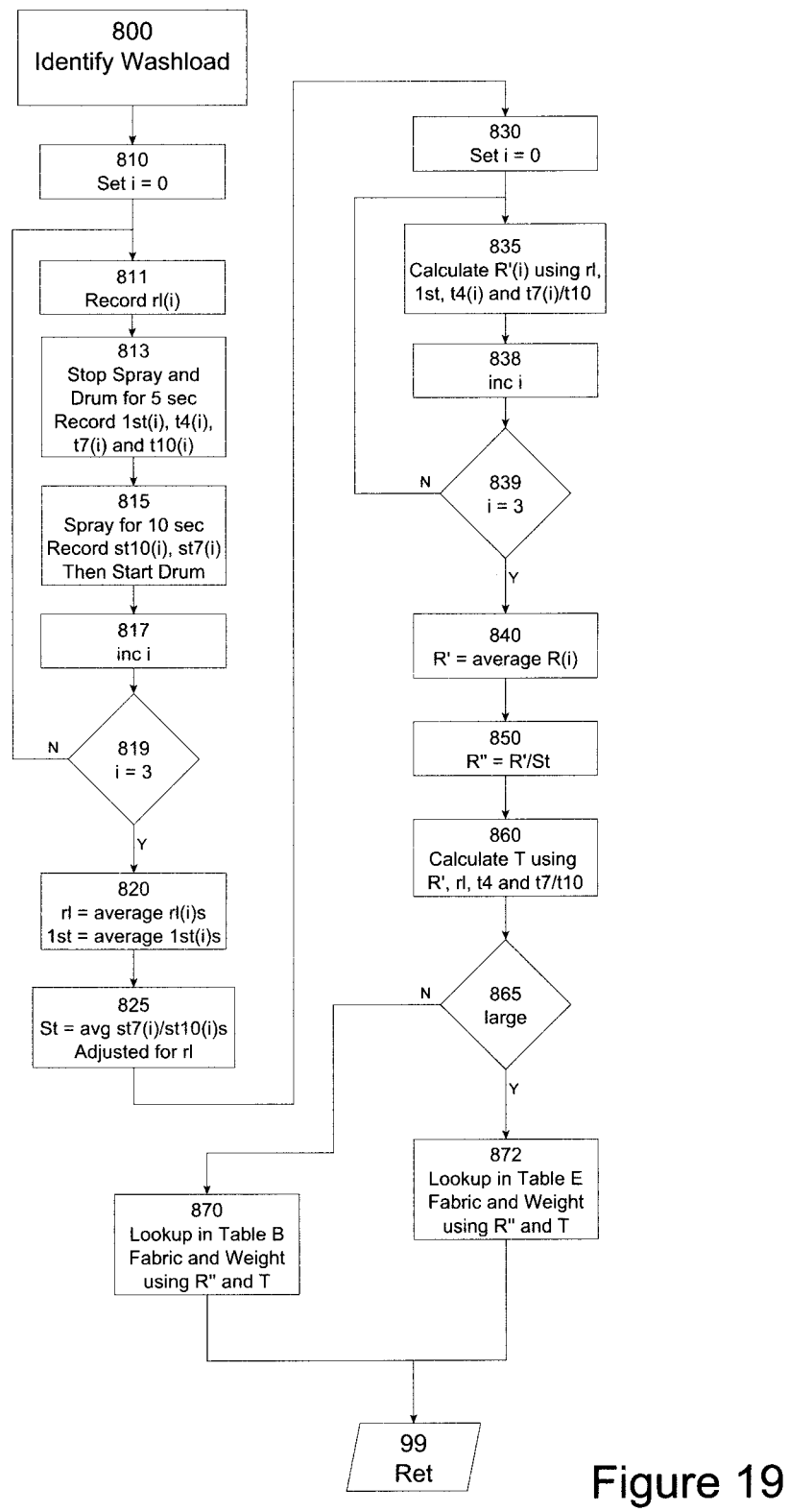
FIG. 19 is a flowchart of the routine used to identify washload properties for the washer in FIG. 18.

FIG. 19 is a flow chart of the preferred method of implementation. The routine is called once the washload wetness is in a steady state and when drum 95 completes 10 seconds of rotation with the spray on. Step 810 clears the pointer. Steps 811-819 form a loop which performs three pairs of pause and start equilibrium transitions and records the three pairs of pause and start variations of sensor 40. Step 811 records rl(i). Then drum 95 and pump 98 are stopped for 5 seconds and 1st(i), t4(i), t7(i) and t10(i) are recorded in Step 813. Pump 98 is restarted in Step 815. Drum 95 rotation is restarted once the water level falls below h7. Drum 95 rotation is not restarted with the spray because rotation of drum 95 rotation forces water from the washload faster than gravity alone. This is an issue because drum 95 rotation will accelerate faster for small loads than for large loads. The faster drum 95 spins the faster water is forced out of the washload. The net effect is that maintaining drum 95 speed during the portion of the variation used for identification simplifies analysis. This method assumes the spray is even enough across the washload without drum 95 rotation not to greatly affect St7/St10. If drum 95 must be rotated to get an even spray an alternative method is for drum 95 to rotate at a fixed speed throughout equilibrium transitions. In the case of a vertical axis washer this effect may not be as significant, but not accelerating the mechanical movement during spray restart still tends to complicate analysis.

Step 817 increments the pointer i for another loop which is executed unless i=3, in which case Step 819 sends the program to Step 820 ending the loop. Step 820 averages the recorded values of 1st(i) and rl(i) to determine 1st and rl respectively. Again, 1st is the average of the 1st(i) from pauses starting with an rl(i) at or below rl. St is adjusted for the running level rl in Step 825 using equation 4 unless the load is large. For large loads Step 825 uses the following modified version of equation 4:

$$St=st10-0.3\cdot(rl-2)-0.7 \qquad (10)$$

Step 830 sets the loop to handle all 3 variations when the spray is paused. Steps 835-839 form a loop in which the ratio of the pause variations R'(i) is calculated. Step 835 calculates R'(i) using equations 1 and 2 unless the load is large. It was found that a version of Table 1 was not necessary for this washer as the water level never reaches the washload during a pause and hence r=r'. For large loads where all variations reach h10, Step 835 uses the following modified versions of equation 1 and 2 respectively:

$$R' = \frac{t10 - t4}{r\cdot(t10 - 1st)} \qquad (11)$$

Where $$r = \frac{h10 - h4}{h10 - h(rl + .5)} \qquad (12)$$

Step 838 increments the pointer to the next variation and Step 839 checks if all 3 variations have been processed.

Once all 3 R'(i)s have been calculated Step 840 calculates R' the average of the R'(i)s. Step 850 is executed calculating R" using equation 5. Then Step 860 calculates T, the time required for the water level to rise 3.5 mm using equations 6-8, unless the load is large. Then Step 860 calculates T10, the time to reach h10 using equation 6 and the following modifications of equations 7 and 8:

$$t10-t4=K\cdot(1+B+B^2+B^3+B^4+B^5) \qquad (13)$$

The length of time for the water to rise the last 0.7 mm prior to h10 is $KB^5$ and the time to cover the 0.7 mm above h7 is $KB^6$. To calculate T10 the following equation is used:

$$T10=t7+X\cdot(rl-2)-1st \qquad (14)$$

Where $X=KB^5$ when rl<2 and $X=KB^6$ when rl>2.

If the load is large, Step 865 sends the program to Step 872 to use Table E to determine the composition of the washload based R" and T which is this case equals T10. If the load is not large, Step 865 sends the program to Step 870 to use Table B to determine the composition of the washload based R" and T. Again, as in the case in all the embodiments, Tables B and E are unique to this model of washer and were determined by testing loads of known composition. Step 99 returns control to the main program.

While transitions were handled in the same way for all three of the preceding embodiments, the fact that there is no direct action between the washload and the pool of water in the third embodiment significantly changes the response. In the first two embodiments drum 95 acceleration is slower for washloads having a larger wet weight. Further, there may be a sudden drop in water level when the washload initially turns far enough that the portion of drum 95 not covered by the washload during the pause reaches the pool of water, after which drum 95 and washload acts as a lift pump. In this case, the initial response is a function of the size and weight of the wet washload, which are a function of f and w. After the initial response, water level declines at a nearly constant rate regardless of composition. To maximize the difference between compositions analysis is focused on the initial response. In the third embodiment the pump rate is unaffected by the weight of the washload; the water level falls at an exponential rate until the flow returning to the pool matches the flow from the pump. Start transitions could be handled using 3 or more points to measure the exponential rate at which the water level falls much like the falling water level is handled for pause transitions. However, as the initial water level of start transition varies significantly, this would require more contacts of the preferred water sensor or a more expensive analog sensor. Similarly, the pause transitions of the third embodiment are not affected by the pool of water.

The method of analyzing 3 or more points of a variation maybe done in many other ways including, but not limited to, using the base B of an exponential that is ratio of two adjacent equal length segments either derived from R' or by modifying the sensor to have equal distances between contacts. Further, other methods of defining a nonlinear curve could be used to determine the washload including, but not limited to, the growth and decay rates associated with B or a time constant. An exponential function is generally defined by 2 points and an asymptote. However, an asymptote is reached after an infinite amount of time. The running level rl is a point commonly used herein, and it is a water level that approximates the asymptote level that would be reached if an equilibrium wetting transition continued for and infinite amount of time. Typically the present method uses three or more points, one of which is a point found using rl. The first point of pause variation used to identify a washload is rl+0.5 at a time of 1st to account for the fact the start of a pause transition has a delay segment, common to all washloads, that differs from a theoretical instantaneous response to a step function. Similarly, the 0.7 second delay segment of a start variation is subtracted from st7 to focus on the portion of the variation after the delay segment.

As mentioned for washloads above 1.5 kg in the first two embodiments and all washloads in the third embodiment, the raw data variables t4, t7, rl and st7 assuming a constant 1st, may be used to determine the composition of most washloads using one or more tables. However, the times t4, t7 and st7 include a delay segment and rl is the water level at the start of a delay segment, so it is preferred to use t4−1st, t7−1st, rl+0.5 and st7−1st if the raw data is used to identify the washload.

The present invention may also be applied to transitions when the washload has not reached equilibrium by using the 3 or more points of variation in water level. Nonequilibrium transitions typically begin with a switch between modes altering the rate at which the volume of water in the washer changes, such as inlet valves opening or closing or a drain pump turning on or off. A nonequilibrium transition may also begin when a new mode of machine operation begins that alters the steady state water level such as a different rotation rate or pump rate during a start transition. A transition to a mode is complete when the water level is nearly constant, or when the washer transitions out of the mode. In the first two embodiments, the pause transitions are complete once the next start transition begins and start transitions are complete after about 5 seconds when the washload is in dynamic equilibrium. However, the washload is not in equilibrium until the transition that started when the fill ended is finished. Until equilibrium is reached, each start transition is finished once the next pause transition begins. Equilibrium is reached when the water level is basically constant during a wetting or start transition ending both the start transition and the transition that began when the fill ended. When the washload is in equilibrium any prior wetness is irrelevant to subsequent transitions.

To determine the composition using transitions not in equilibrium requires additional data such as the magnitude of an equilibrium transition performed on the washload or any other means of determining a property of the washload or a means of determining washload wetness when the washload is not in equilibrium. Nonequilibrium transitions may be used to approximate f to speed up the identification process or in deep fill washers, which never reach equilibrium until the washload is submerged. It is best to limit the variables affecting the water level when using nonequilibrium transitions. When the portion of a response which is essentially a result of the changing washload wetness alone is analyzed, R' remains a good approximation of f. A transition beginning with a pause in the flow of external water can be applied to the washers in FIGS. 1 and 18 to estimate f, preferably when the water level is below the washload and conditions that alter the water level (such as water dripping off a drum or tub) are minimized. Three or more points and in particular R', of the resulting variation after the delay segment, may be used as an approximation of f. In this case, the delay segment ends when the last of the spray has reached the washload and the bulk of the water not in the washload has returned to the pool of water in the tub. The value of R' for each f and w combination will be different than the value was in the first two embodiments as there is no interaction between the pool of water and the washload. This type of transition may be preferable when using a pressure sensor to implement the present invention because the length of the delay segment may be chosen so that the portion of pressure sensor variation used to determine f is essentially caused by the change in washload wetness alone and not the pressure variation caused by the vertical movement of the washer, with the approximated value of f being finalized using an equilibrium transition.

A start variation occurring during any nonequilibrium transition may be used to approximate f using the portion the variation when rl is constant or changing at a known rate for all washloads when the washload is in equilibrium. Two periods in the first embodiment that meet these criteria are respectively the last 5 seconds of a start transition and the period from st7 until rl is approached. The water level drop during these periods as compared to the expected level if the washload were in equilibrium is an exponential that is a function of washload wetness, the rate of change in the volume of water present in the washer, and f and w. Three or more points may be used to estimate f along with an accurate estimate of the flow into or out of the washer. The typical nonequilibrium transition may include multiple pairs of start and pause transitions. The points used in identifying the washload may be obtained from any part of the nonequilibrium transition.

The present invention may also be applied to deep fill washers or wash cycles that are deep fill. If the washer has a horizontal axis, the first two embodiments can be used to determine the washload composition by performing the testing when the water level is low and then finishing the deep fill. For a deep fill cycle in a horizontal recirculation washer, any of the prior embodiments maybe used to determine the washload. For a deep cycle in a vertical axis washer, either of the first two embodiments may be used if the washer includes an agitator designed to move the washload in and out of a pool of water. Of course, if there is a recirculation pump, the third embodiment may be employed.

Figure 20:
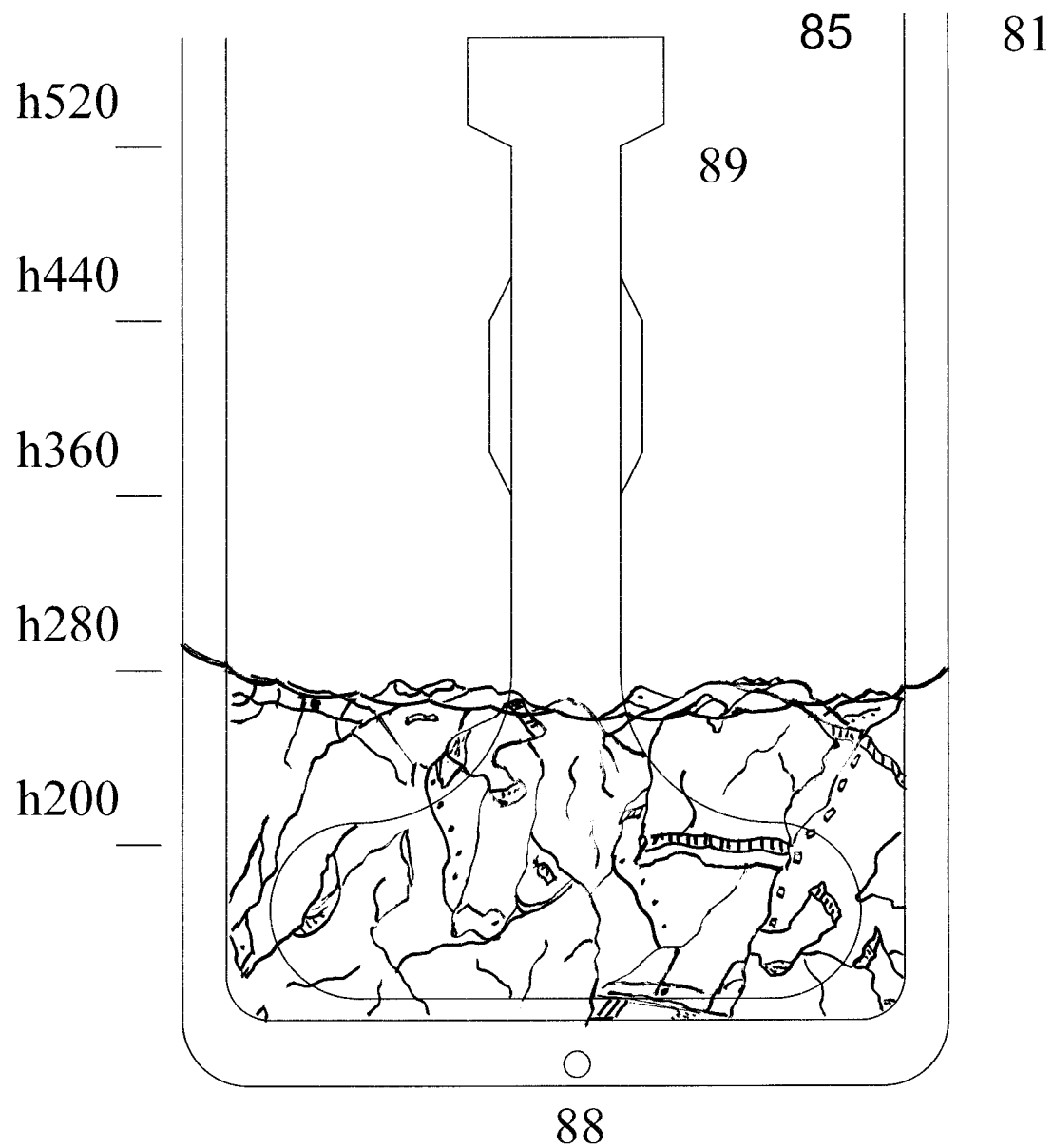
FIG. 20 shows a vertical axis deep fill washing machine having 5 fill levels to handle small to large loads.

For a vertical axis deep fill washer without a recirculation pump or an agitator to mix and move the washload in and out of a pool of water, the first three embodiments do not apply. The first three embodiments all use equilibrium transitions to determine properties. Equilibrium transitions as defined herein only occur once the washload reaches a dynamic equilibrium or balance. Deep fill washers with no means of using the water present in the washer to wet washload above the water level can only achieve a static equilibrium. Static equilibrium occurs when the washload is essentially submerged, whereas dynamic equilibrium requires a wetting mode to maintain a constant water level and washload wetness and occurs with a significant portion of the washload above the water level. Static equilibrium does not require a wetting mode as a submerged washload is saturated and remains saturated until the water level drops. FIG. 20 shows a vertical axis washer with a second agitator 89 inside the agitator drum 85 which is inside tub 81. Tub 81 includes outlet 88 through which water may pass to sensor 40. Levels h1-h7 of sensor 40 are below drum 85 in this embodiment, and contact at h10 is not present. The water sensor 40 may be modified with additional contacts located at heights h200, h280, h360, h440 and h520 which correspond to small, medium small, medium, medium large and large loads respectively.

To apply the present invention to the washer in FIG. 20, a fill pause transition prior to the water level reaching the bottom of drum 85 and 3 or more points of the subsequent curve of the rise in water level are used. This transition alone does not produce an accurate value of weight as the wetness of the washload is unknown. However, the 3 points yield a value of R' obtained using equation 3 that produces an acceptable value of f which can be improved if the washload weight is known. The washload weight may be determined using the density off and the volume of the washload to complete the identification.

It is preferred that the method of determining volume be independent of the initial state of washload wetness when the wash cycle begins. In the fourth embodiment volume is determined using the level of water needed to submerge the washload. To find volume of the washload the washer in FIG. 20 is filled while rotating drum 85 to h200. Then the fill and drum 85 are stopped for 10 seconds. The resulting change in observed water level is used to determine volume. Factors affecting the water level include cessation of force applied to the water by the rotation of drum 85, and the collection of water located above h200 at the start of the pause. Water above h200 at the beginning of the transition includes water on the surfaces of the washer, incoming fill water in transit when the fill was stopped, and water in the portion of the washload, if any, above the h200. The rotation rate of drum 85 was chosen to ensure the water level in sensor 40 will fall and remain below h200 if the washload is essentially submerged. The rotation rate may be the same at each level tested. However, in this embodiment, the rotation rate is slightly lower at each level h280, h360, h440 and h520 than the previous level, as the amount of water in transit when the fill is stopped and amount of free water above the water line is reduced as the water level rises. For washers such as the one shown in FIG. 20, some of the washload typically will remain above the surface of the water no matter how much water is added; this small amount a fabric is generally saturated with water. When the lowest possible use of water is a priority, the amount of washload allowed above the water should be taken into account when the rotation rate during a fill is chosen. To this end, the rotation rate may be adjusted based on the approximated value off and the water level at which the test is performed.

The washload is small if the water level is below h200 after 10 seconds. After the washload is identified as small, the washer proceeds with normal operations for a small washload composed of f and a weight as indicated by a washload with a volume essentially covered a water level of h200 composed of f. If level remains or rises back to h200 after 10 seconds of pause, the washload is not small. The process is repeated at h280, h360, h440 and h520 as needed.

Figure 21:
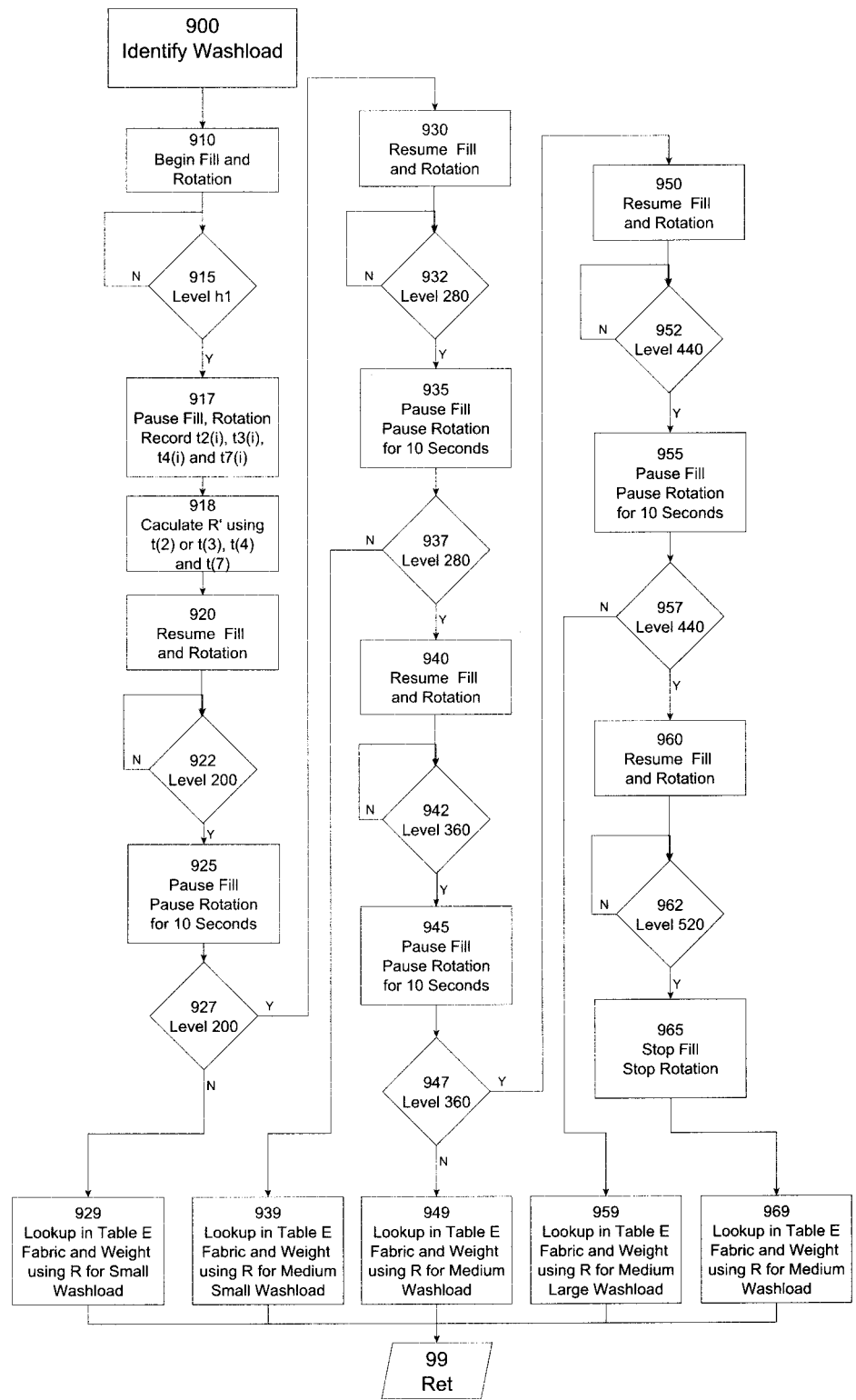
FIG. 21 is a flowchart of the routine used to identify washload properties for the washer in FIG. 20.

FIG. 21 shows the preferred method of determining unknown washloads. Step 910 starts filling the washer while slowly rotating drum 85 to evenly wet the clothes. Step 915 checks if level h1 has been reached. When h1 is reached, Step 917 pauses the incoming water flow and drum 85 rotation and records the variation to the transition. Step 918 calculates R' using the following equation:

$$R' = \frac{t7 - t4}{r \cdot (t7 - x)} \quad (15)$$

Where $$r = \frac{h7 - h4}{h7 - y} \quad (16)$$

Where if t2>2.5 seconds x=t2 and y=h2, otherwise x=t3 and y=h3.

Using points of the variation after 2.5 seconds is intended to minimize the water level rise caused by fill water in transit or anything other than the rise due to the water draining from washload to focus on the part of the curve most affected by the washload. The fabric f of the washload is indicated by R'.

Step 920 resumes filling the washer with drum 85 rotating until level h200 is reached. The rotation rate is sufficient to ensure when drum 85 and the fill are stopped for 10 seconds the observed level will fall and remain below h200 if essentially no part of the washload is above h200. The fill continues until Step 922 determines level h200 has been reached. Then Step 925 pauses the fill and drum 85 rotation for 10 seconds. If Step 927 determines the water level is below h200, Step 929 identifies the washload composition based on a small washload volume and R' using table E.

If the water level is above h200 the washload is not small and Step 930 resumes the fill and rotation. Operation remains in a loop until Step 932 determines h280 has been reached. Then Step 935 pauses the fill and drum 85 rotation for 10 seconds. Step 937 checks if the washload is medium small as indicated by a water level below h280 after the 10 second pause. If the washload is medium small, Step 939 determines the washload composition using R' and a volume of medium small. Step 99 the returns to the main program.

If the washload is at least medium in size, Step 940 resumes the fill and the rotation until Step 942 detects water at h360, at which time Step 945 stops the fill and rotation for 10 seconds. Then Step 947 checks if the water level is at or above h360. If water is not present at h360, the washload size is medium and the composition is determined by Step 949 using R for a medium load after which Step 99 returns control to the main program.

If the washload is larger than a medium sized load, Step 950 resumes the fill and rotation, both of which are paused by Step 955 after Step 952 senses water at h440. After the fill and the rotation have been paused for 10 seconds, Step 957 checks for water at h440. If there is no water at h440, Step 959 determines the composition of the medium large sized washload. Then control is returned to the main program via Step 99.

If the washload is large, Step 960 resumes the fill and rotation which is stopped by Step 965 once Step 962 indicates the water level has reached level h520. Step 969 looks up the composition for a large load with value of R calculated in Step 918. Step 99 then ends the washload determining subroutine.

While all equilibrium transitions in the embodiments either start in a paused mode and end in a mode producing dynamic equilibrium or start in a mode producing dynamic equilibrium and end in a paused mode, it is possible for an equilibrium transition to occur between other modes. The stop mode and a wetting mode yielding equilibrium were used because they produce the largest difference in washload wetness and therefore are the preferred modes. Equilibrium transitions may further use other means to wet the washload than those shown in the preferred embodiments. There may be more than two types of equilibrium transitions. A dehydration transition may use methods other than gravity, such as centripetal acceleration, to lower the wetness of the washload. There may be more than one state of equilibrium; for example increasing the rpm at which the drum rotates in the first embodiment, lowering the pump rate in the third embodiment or changing the volume water in any washer. Further, while the embodiments all used the same type of water sensor, it is within the scope of the present invention to use any means to determine water level such as, but not limited to, a pressure sensor. When pressure is measured, the vertical movement of the washtub can complicate measurement the water level change due to the equilibrium transition. However, the vertical movement ends very quickly when the drum is paused, allowing good data to be obtained using pause transitions and focusing on the portion of the resulting variation after the vertical motions have subsided. An acceptable value of rl may be found by averaging the indicate level once the start transition has brought the water level to a steady state, typically after about 5 seconds for the washer in FIG. 1.

Reference data may be the stored results from tests on known compositions or calculated at least in part from known properties of fabrics. Calculating reference data is simpler when the period of the response used for the identification is solely determined by the washload. Finally, the present invention is not limited to the embodiments presented. It may be applied to other modes of operation which can alter the wetness of the washload in any type of washer.

It is claimed:

1. A method of controlling a washing machine operating in a plurality of modes provided with a tub and an agitator that moves a washload within the tub in at least one mode, the washload having properties comprised of fabric, weight and absorption, the washing machine further provided with a sensor, output of the sensor indicating water level of a pool of water in the washing machine and access to reference data, the method comprising:

filling the washing machine with water, operating the washing machine in a wetting mode with a portion of the washload above water level and a constant amount of water in the washing machine, the wetting mode bringing the washload to dynamic equilibrium when water level is essentially constant and output of the sensor indicates water is present in the tub, performing each type of one or more types of equilibrium transition, every equilibrium transition of the one or more types of equilibrium transition performed with the washload in the washing machine after the operating step has brought the washload to dynamic equilibrium, each of the one or more types of equilibrium transition between a unique pair of modes, each type of the one or more types of equilibrium transition causing a corresponding change in how much water is absorbed in the washload by transferring water between the washload and the pool of water, the one or more types of equilibrium transition corresponding one to one with one or more types of variation in output of the sensor, the one or more types of equilibrium transition including a first type of equilibrium transition, the one or more types of variation in output of the sensor including a first type of variation in output of the sensor, the first type of variation in output of the sensor resulting from the first type of equilibrium transition, compiling test data representing each corresponding change in how much water is absorbed in the washload as shown by a total of three or more points from a single variation of each type of the one or more types of variation in output of the sensor, identifying a property of the washload properties by comparing the test data to the reference data, modifying operation of the washing machine based on the identified property of the washload properties.

2. The method of claim 1 wherein the total of three or more points include at least three points of a single first type of variation in output of the sensor.

3. The method of claim 1 wherein the identified property of the washload properties is the fabric of the washload.

4. The method of claim 1 wherein an initial portion of the first type of variation in output of the sensor is a delay segment, during the delay segment the first type of variation in output of the sensor does not indicate a detectable change in how much water is absorbed in the washload, and wherein test data compiled from the first type of variation in output of the sensor represents only a second portion of the first type of variation in output of the sensor, the second portion of the first type of variation in output of the sensor beginning when the delay segment ends.

5. The method of claim 1 wherein the one or more types of equilibrium transition include a second type of equilibrium transition, the first type of equilibrium transition causing the washload to leave dynamic equilibrium, the second type of equilibrium transition returning the washload to dynamic equilibrium.

6. The method in claim 1 wherein the total of three or more points occur when the washload holds essentially no free water.

7. The method of claim 1 wherein the washing machine is a recirculation washing machine, the washing machine further provided with a recirculation pump, the one or more types of equilibrium transition include a second type of equilibrium transition, the first type of equilibrium transition from a first mode to a second mode, the second type of equilibrium transition from the second mode to the first mode, wherein the first mode is recirculation pump on and the second mode is recirculation pump off.

8. The method of claim 1 further including a step of ascertaining an estimate of the identified property of the washload properties using a method that assumes the washload is dry when entering the tub, and a step of calculating a volume of water held by the washload prior to the washload reaching dynamic equilibrium by comparing the identified property of the washload properties and the estimate of the identified property of the washload properties.

9. A method of controlling a washing machine operating in a plurality of modes provided with a tub and a drum that moves a washload within the tub in at least one mode, the washload having properties comprised of fabric, weight and absorption, the washing machine further provided with a sensor, output of the sensor indicating water level of a pool of water in the washing machine and access to reference data, the method comprising:

filling the washing machine with water, operating the washing machine in a wetting mode with a portion of the washload above water level and a constant amount of water in the washing machine, the wetting mode rotating the drum on a horizontal axis with a portion of the drum below water level, the wetting mode bringing the washload to dynamic equilibrium when water level is essentially constant and output of the sensor indicates water is present in the tub, performing each type of one or more types of equilibrium transition, every equilibrium transition performed with the washload in the washing machine after the operating step has brought the washload to dynamic equilibrium, each of the one or more types of equilibrium transition between a unique pair of modes, each of the unique pair of modes is a pair of rotation rates of the drum on a horizontal axis, the one or more types of equilibrium transition corresponding one to one with one or more types of variation in output of the sensor, the one or more types of equilibrium transition including a first type of equilibrium transition, the one or more types of variation in output of the sensor including a first type of variation in output of the sensor, the first type of variation in output of the sensor resulting from the first type of equilibrium transition, compiling test data from each type of the one or more types of variation in output of the sensor, identifying a property of the washload properties by comparing the test data to the reference data, modifying operation of the washing machine based on the identified property of the washload properties.

10. The method of claim 9 wherein the test data represents at least three points of a single first type of variation in output of the sensor.

11. The method of claim 9 wherein identified property of the washload properties is the fabric of the washload.

12. The method of claim 9 wherein an initial portion of the first type of variation in output of the sensor is a delay segment, during the delay segment the first type of variation in output of the sensor does not indicate a detectable change in how much water is absorbed in the washload, and wherein test data compiled from the first type of variation in output of the sensor represents only a second portion of the first type of variation in output of the sensor, the second portion of the first type of variation in output of the sensor beginning when the delay segment ends.

13. A method of controlling a washing machine operating in a plurality of modes provided with a tub and an agitator that moves a washload within the tub in at least one mode, the washload having properties comprised of fabric, weight, and absorption, the washing machine further provided with a sensor, output of the sensor indicating water level of a pool of water in the washing machine and access to reference data, the method comprising:

filling the washing machine with water wetting the washload, executing each type of one or more types of transition, all of the one or more types of transition occurring with the washload in the washing machine when output of the sensor indicates water is present in the tub and prior to the washload achieving equilibrium, each type of the one or more types of transition between a unique pair of modes, each of the one or more types of transition changing how much water is absorbed in the washload by transferring water between the washload and the pool of water, the one or more types of transition corresponding one to one with one or more types of variation in output of the sensor, the one or more types of transition including a first type of transition, every other type of the one or more types of transition occurring during the first type of transition, the first type of transition from a mode with water flowing into the washing machine to a constant water mode, the constant water mode maintaining a constant amount of water in the washing machine, the washing machine remaining in the constant water mode throughout the first type of transition, the first type of transition ending when the washing machine ceases operating in the constant water mode unless the washload reaches equilibrium first ending the first type of transition, the first type of transition occurring when a portion of the washload is above water level and water is being released from the washload, the one or more types of variation in output of the sensor including a first type of variation in output of the sensor resulting from the first type of transition, compiling test data from each type of the one or more types of variation in output of the sensor, the test data representing three or more points of the first type of variation in output of the sensor, identifying the fabric of the washload by comparing the test data to the reference data, modifying operation of the washing machine based on the identified fabric of the washload.

14. The method of claim 13 wherein the first type of transition stops all active wetting modes, the three or more points of the first type of variation in output of the sensor occurring prior to resumption of any wetting mode.

15. The method of claim 13 wherein the one or more types of transition include a fourth type of transition, the one or more types of variation in output of the sensor include a fourth type of variation in output of the sensor, the fourth type of variation in output of the sensor resulting from the fourth type of transition, wherein an initial portion of the fourth type of variation in output of the sensor is a delay segment, during the delay segment the fourth type of variation in output of the sensor does not indicate a detectable change in how much water is absorbed in the washload, and wherein test data compiled from the fourth type of variation in output of the sensor represents only a second portion of the fourth type of variation in output of the sensor, the second portion of the fourth type of variation in output of the sensor beginning when the delay segment ends.

16. The method of claim 13 wherein the one or more types of transition include a second type of transition, the one or more types of variation in output of the sensor include a second type of variation in output of the sensor, the second type of transition causing the second type of variation in output of the sensor, the second type of transition from a pause mode to a wetting mode, at least three of the three or more points occurring in a test portion of the second type of variation in output of the sensor, the reference data includes data representing a known rate of water level change common to all washloads during a reference portion of a variation in the output of the sensor resulting from an equilibrium transition from the pause mode to the wetting mode, the test portion and the reference portion having a common start and a common end relative to onset of each respective variation in output of the sensor, and wherein the identifying step comparing the known rate of water level change and a rate of water level change indicated by the at least three of the three or more points occurring in the test portion of the second type of variation in output of the sensor.

17. The method of claim 16 wherein the known rate is zero because the washload is in dynamic equilibrium.

18. The method of claim 13 wherein the one or more types of transition include a second type of transition and a third type of transition, the second type of transition starting a wetting mode, the third type of transition stopping the wetting mode, the one or more types of variation in output of the sensor include a third type of variation in output of the sensor, the third type of transition causing the third type of variation in output of the sensor, and wherein at least three of the three or more points occur during the third type of variation in output of the sensor.

19. The method in claim 13 wherein the weight of the washload is determined by bringing the washload to dynamic equilibrium and using the identified fabric of the washload and a variation of the output of the sensor resulting from an equilibrium transition.

20. The method of claim 13 wherein the weight of the washload is determined using the identified fabric of the washload and washload volume, wherein washload volume is determined using a level of water needed to submerge the washload.

* * * * *